(12) United States Patent
Butler et al.

(10) Patent No.: US 7,633,971 B1
(45) Date of Patent: Dec. 15, 2009

(54) METHOD AND SYSTEM FOR TRANSPORT OF PACKET-BASED DATASTREAMS OVER FRAME-BASED TRANSPORT SYSTEMS EMPLOYING PHYSICALLY DIVERSE TRANSMISSION CHANNELS

(75) Inventors: Robert K. Butler, McKinney, TX (US);
William C. Szeto, McKinney, TX (US);
Robert W. Cantwell, Lucas, TX (US);
Rajendra R. Damle, Plano, TX (US);
Debasish Nag, Richardson, TX (US)

(73) Assignee: Ceterus Networks, Inc., Richardson, TX (US)

( * ) Notice: Subject to any disclaimer, the term of this patent is extended or adjusted under 35 U.S.C. 154(b) by 1003 days.

(21) Appl. No.: 10/403,840

(22) Filed: Mar. 31, 2003

Related U.S. Application Data

(60) Provisional application No. 60/410,425, filed on Sep. 13, 2002.

(51) Int. Cl.
*H04J 3/24* (2006.01)
(52) U.S. Cl. ................ 370/474; 370/419; 710/316
(58) Field of Classification Search ................ None
See application file for complete search history.

(56) References Cited

U.S. PATENT DOCUMENTS

| | | | |
|---|---|---|---|
| 4,383,316 A | 5/1983 | Seidel | 370/118 |
| 4,577,312 A | 3/1986 | Nash | 370/84 |
| 4,703,475 A | 10/1987 | Dretzka et al. | 370/60 |
| 4,775,987 A | 10/1988 | Miller | 375/38 |
| 4,885,738 A | 12/1989 | Bowers et al. | 370/58.1 |
| 4,991,172 A | 2/1991 | Cidon et al. | 370/94.1 |
| 5,065,396 A | 11/1991 | Castellano et al. | 370/84 |
| 5,251,210 A | 10/1993 | Mann et al. | 370/84 |
| 5,293,378 A | 3/1994 | Shimizu | 370/94.1 |
| 5,570,356 A | 10/1996 | Finney et al. | 370/85.9 |
| 6,072,772 A * | 6/2000 | Charny et al. | 370/229 |
| 6,392,994 B1 * | 5/2002 | Dubuc | 370/230 |
| 6,775,305 B1 * | 8/2004 | Delvaux | 370/535 |
| 6,791,991 B1 * | 9/2004 | Mobin et al. | 370/412 |
| 6,982,991 B1 * | 1/2006 | Atoji | 370/474 |
| 7,006,497 B2 * | 2/2006 | Dove et al. | 370/390 |
| 7,016,366 B2 * | 3/2006 | Kawarai et al. | 370/413 |
| 7,058,751 B2 * | 6/2006 | Kawarai et al. | 710/317 |

OTHER PUBLICATIONS

*Inverse Multiplexing: Scalable Bandwidth Solutions for the WAN*; The Technology Guide Series™; Editor Jerry Ryan; Copyright 2000 by the Applied Technologies Group; 49 Pages.

Rajendra R. Damle et al.; *Transport of High-Bandwidth Datastreams Over a Network*; U.S. Appl. No. 10/074,264, filed Feb. 12, 2002; 27 Pages of Specification; and 8 Sheets of Drawings (our reference No. CET0006US) [copy enclosed].

Rajendra R. Damle; *Frame Structure and Method for Wavelength Concatenated Channel Framing*; U.S. Appl. No. 10/086,273, filed Feb. 20, 2002; 58 Pages of Specification; and 23 Sheets of Drawings (our reference No. CET0006P1US) [copy enclosed].

* cited by examiner

*Primary Examiner*—Bob A Phunkulh
(74) *Attorney, Agent, or Firm*—Campbell Stephenson LLP

(57) ABSTRACT

A transport unit is disclosed. On a transmit side, the transport unit includes a payload data unit (PDU) formation unit, a frame formation unit and a scheduler. An input of the scheduler is coupled to the PDU formation unit, and an output of the scheduler is coupled to the frame formation unit. On a receive side, the transport unit includes a distribution unit (which includes a group synchronization unit), a channel resequencing unit (coupled to the group synchronization unit), and a scheduler (coupled to the channel resequencing unit).

10 Claims, 16 Drawing Sheets

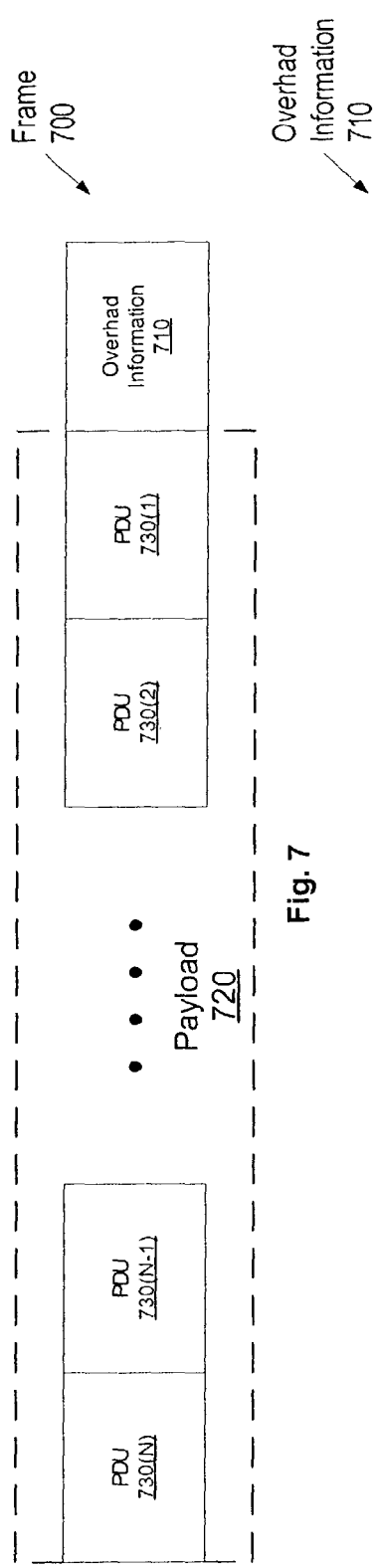
Fig. 7
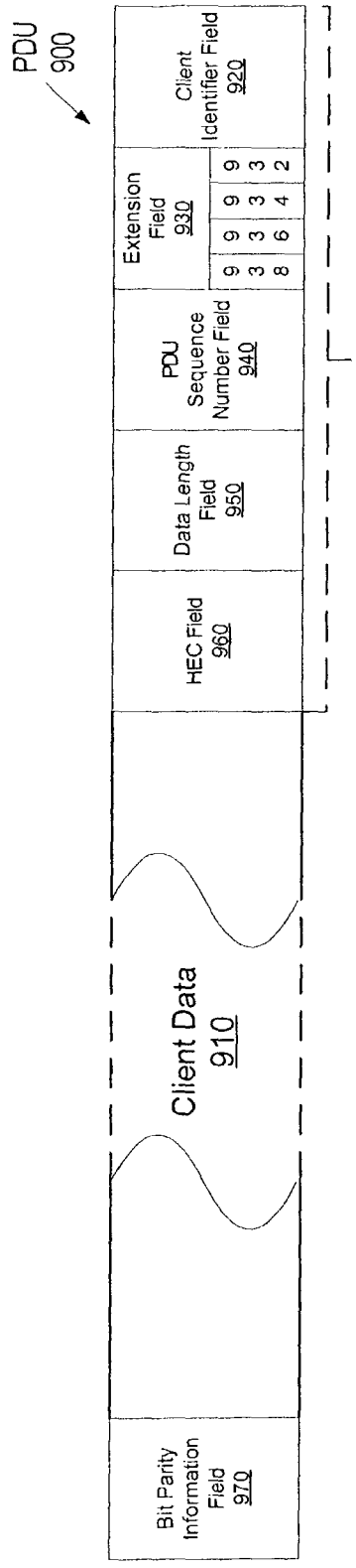
Fig. 8
Fig. 9

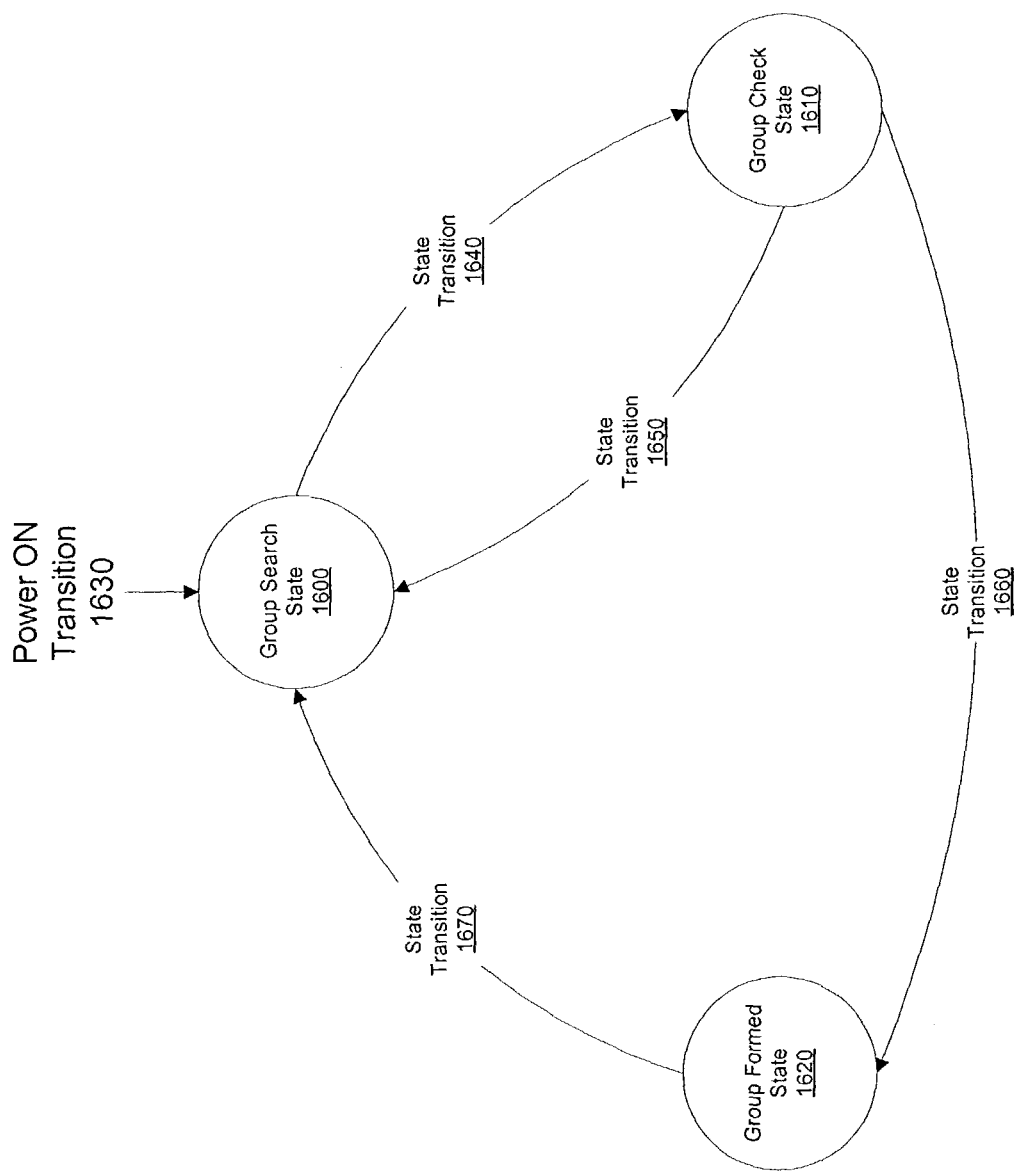

METHOD AND SYSTEM FOR TRANSPORT OF PACKET-BASED DATASTREAMS OVER FRAME-BASED TRANSPORT SYSTEMS EMPLOYING PHYSICALLY DIVERSE TRANSMISSION CHANNELS

CROSS-REFERENCE TO RELATED APPLICATIONS

This invention claims priority from Provisional Patent Application Ser. No. 60/410,425, entitled "METHOD AND APPARATUS FOR TRANSPORT OF PACKET-BASED DATASTREAMS OVER FRAME-BASED TRANSPORT SYSTEMS", filed Sep. 13, 2002, having R. Butler, W. Szeto, R. Cantwell, R. Damle, D. Nag, J. Carrel, T. Robinson, T. Lunsford, R. Raja, S. Amble and S. Deans as inventors, which is incorporated herein by reference, in its entirety and for all purposes.

BACKGROUND OF THE INVENTION

1. Field of the Invention

This invention relates to the field of information networks, and more particularly relates to a method and system for conveying information over a network.

2. Description of the Related Art

Today's networks carry vast amounts of information. High bandwidth applications supported by these networks include streaming video, streaming audio, and large aggregations of voice traffic. In the future, these demands are certain to increase. To meet such demands, an increasingly popular alternative is the use of lightwave communications carried over fiber-optic cables. The use of lightwave communications and their associated protocols provide several benefits, including high bandwidth, ease of installation, and capacity for future growth, although the protocols used in such applications may not be appropriate for use in end-user networks. However, in this new age of data-centric communication networks, the ability to support such user protocols is desirable. Traditionally, two types of telecommunication networks have been developed.

The first type is connection-oriented and is used for the transport of, for example, narrow-band voice traffic, typically carried in time-division multiplexed (TDM) or other synchronous frames. Such networks are, typically, synchronous or plesiochronous networks. The second type of legacy network is connection-less in nature, and is used for the transport of broad-band packet or cell-based data traffic. There is currently a drive towards unified networks which provide end-to-end transport for both voice and data services. However, as there is a well-established voice network base, network operators are naturally reluctant to replace such legacy networks.

Moreover, over the next several years, the growth projected by major service providers in their data (e.g., internet protocol, or IP) networks will only increase the demand on existing infrastructure for bandwidth. The architecture of a typical high-bandwidth backbone network has at least three important properties:

1) Relatively small numbers of nodes, which are interconnected with very high bandwidth links.

2) As the traffic increases, the bandwidth required between these nodes increases, but the number of nodes stays relatively the same.

3) The nodes are widely distributed, often with inter-node distances of well over 1000 km.

Today, as the bandwidth requirements between the core nodes continue to increase, the existing infrastructure is becoming more and more stressed. Beyond current achievable limits, even if it were possible to increase the port speeds of the nodes, the transport systems cannot transport such high data rates using the currently-installed fiber infrastructure without expensive and frequent regeneration. This limitation of economically transporting high data rates over long distances is another important limitation that requires solution.

The ability to support various user protocols across a metropolitan area network (MAN), across the core or in other such situations in which disparate protocols are used, is thus desirable. There is also the need to transport such information in a cost-effective and economical manner. Thus, there is a need to provide an interface between these two types of networks that meets the needs of high-bandwidth applications.

SUMMARY OF THE INVENTION

In one embodiment of the present invention, a transport unit is disclosed. The transport unit includes a payload data unit (PDU) formation unit, a frame formation unit and a scheduler. An input of the scheduler is coupled to the PDU formation unit, and an output of the scheduler is coupled to the frame formation unit.

In another embodiment of the present invention, a transport unit is disclosed. The transport unit includes a distribution unit (which includes a group synchronization unit), a channel resequencing unit (coupled to the group synchronization unit), and a scheduler (coupled to the channel resequencing unit).

In yet another embodiment of the present invention, a method of transmitting data is disclosed. The method includes receiving a number of data packets, forming a number of PDUs from the data packets and forming an output frame from the PDUs.

In still another embodiment of the present invention, a method of receiving data is disclosed. The method includes receiving a data frame, extracting a number of payload data units (PDUs) from the data frame and extracting a number of data packets from each of the PDUs.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 7 is a block diagram illustrating a frame according to embodiments of the present invention.

FIG. 8 is a block diagram illustrating an example of the fields within overhead information according to an embodiment of the present invention.

FIG. 9 is a block diagram illustrating a format of a PDU according to embodiments of the present invention.

FIG. 16 is a state diagram illustrating a state machine capable of finding and synchronizing on the largest group of channels that arrive within a specified skew window according to embodiments of the present invention.

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Introduction

The present invention provides for the conveyance of packetized datastreams in a frame-based communications environment by first translating packetized datastreams into an intermediate format (payload data units, or PDUs), and then aggregating the PDUs thus formed into frame-based datastreams.

A universal transport platform (UTP) is defined that enables multiple datastreams to be simultaneously transported across multiple long distance transmission links with inherent protection. A UTP according to the present invention is agnostic to all existing and future framing protocols and data rates. This independence enables a universal transport system (UTS, or transport unit) according to the present invention to be built that is specific to access, metro or core network applications. The UTP is also capable of supporting next-generation routers/switches with very high data rate ports (e.g., 40 Gb/s and above), deployable over any existing transmission system. Another application of the UTP is the emerging area high-speed backplane connectors.

An Example Network Element Architecture

Figure 1:
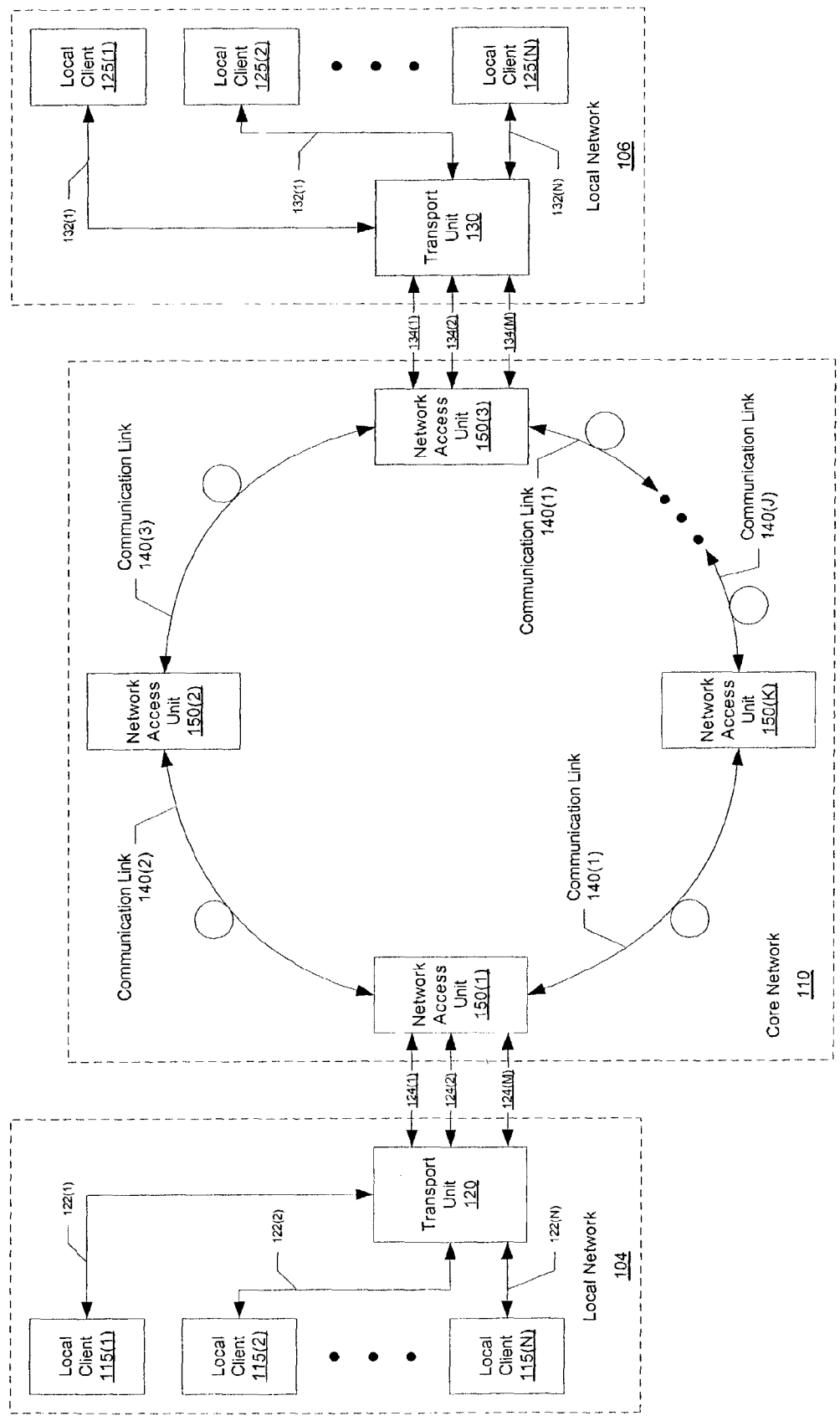
FIG. 1 is a block diagram illustrating a network employing an architecture supported by embodiments of the present invention.

FIG. 1 is a block diagram illustrating a network 100 that employs an architecture supported by embodiments of the present invention. Network 100 includes local networks 104 and 106. Local networks 104 and 106 communicate with one another via a core network 110. Local network 104 includes a number of local clients (depicted as local clients 115(N)), which are coupled to a transport unit 120 via communication lines 122(1)-(N). In turn, transport unit 120 is coupled to core network 110 by communication lines 124(1)-(M). In certain embodiments of the present invention, communication lines 122(1)-(N) carry packet data streams (i.e., datastreams in which the data being transported has been divided into packets). In contrast, using such an embodiment, data carried by communication lines 124(1)-(M) are transported using a frame-based protocol (i.e., a protocol in which the data being transported is loaded into frames).

Similarly, local network 106 includes a number of local clients (depicted as local clients 125(1)-(N)) which are coupled to a transport unit 130 via a number of communication lines (depicted as communication lines 132(1)-(N)). Also in a manner similarly to that previously discussed, transport unit 130 is coupled to core network 110 via a number of communication lines 134(1)-(M). As before, communication lines 132(1)-(N) carry data in a packetized format, while communication lines 134(1)-(M) carry data in a frame-based format. Providing communications between local networks 104 and 106, core network 110 supports such communications via a number of communication links 140(1)-(J). Communication links 140(1)-(J), in one embodiment of the present invention, interconnect a number of network access units (depicted in FIG. 1 as network access units 150(1)-(K)). As is apparent from FIG. 1, core network 110 is depicted as employing a ring topology. However, as will be apparent to one of skill in the art, core network 110 can be configured in any of a number of topologies, and employ any one of a number of protocols for transferring the frame-based data received from local networks 104 and 106 to one another. In the topology depicted in FIG. 1, network access unit 150(1)-(K) can be implement, for example, using add/drop multiplexers (ADM).

It will be noted that the variable identifier "N" is used (as are the variable identifiers "M", "J", "K" and so on) in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of network 100). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

An Example Network Element

Figure 2:
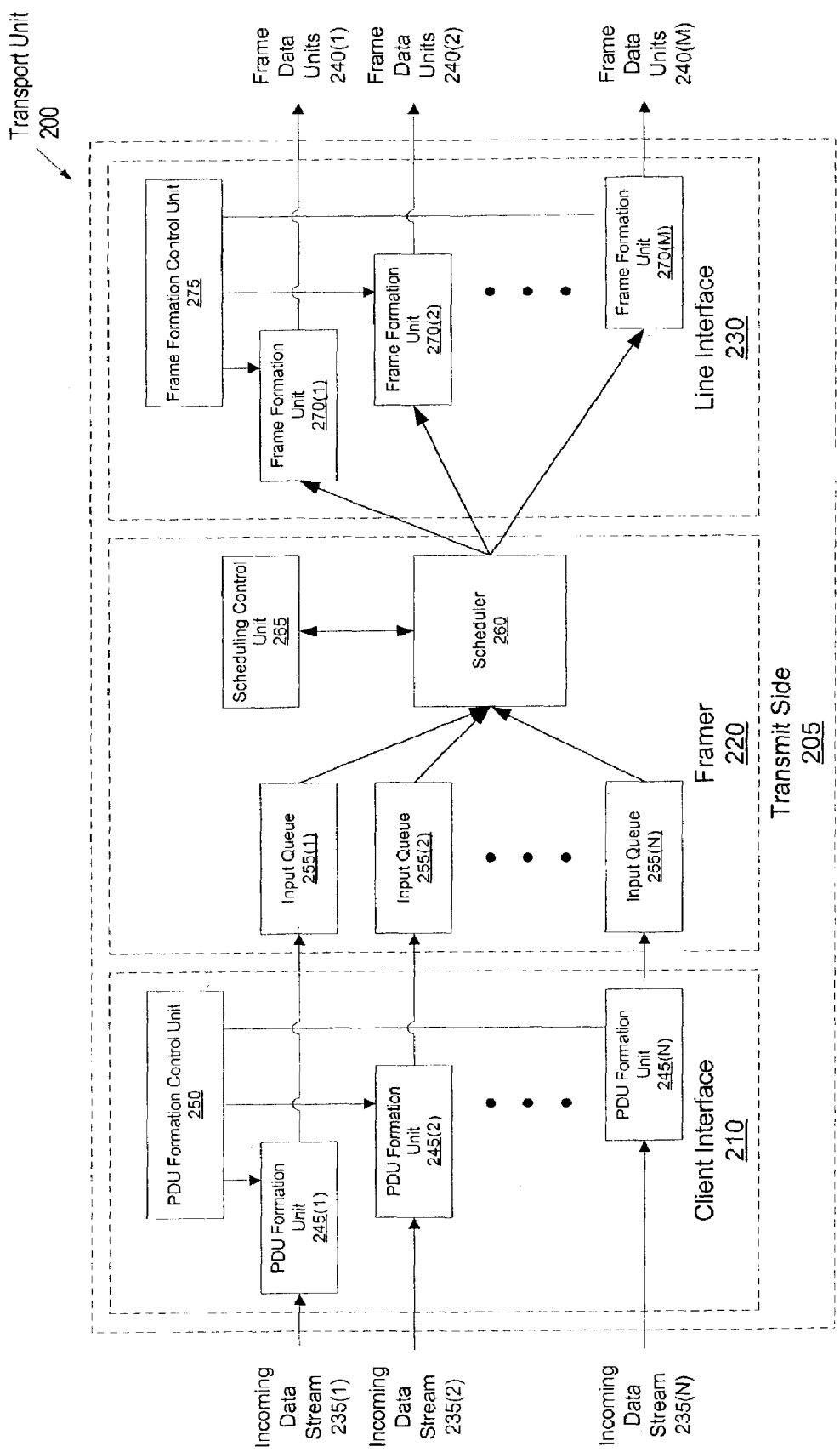
FIG. 2 is a block diagram illustrating the major components of the transmit side of a transport unit according to the present invention.

FIG. 2 is a block diagram illustrating the major components of a transport unit such as transport units 120 and 130, and depicted in FIG. 2 as a transport unit 200. Transport unit 200 includes, generally, three major sections: a client interface, a framer and a line interface. Transmit side 205 of transport unit 200, similarly, includes a client interface 210, a framer 220 and a line interface 230.

The transmit side of a transport unit such as transport unit 200 receives a number of incoming datastreams (depicted as incoming datastreams 235(1)-(N)), which present data to transport unit 200 as packets. Transport unit 200 then translates these packets into payload data units (PDUs) and distributes these PDUs in a manner that allows for the formation of framed data. This framed data appears at the outputs of transport unit 200 as framed data units 240(1)-(M). In translating incoming datastreams 235(1)-(N) into framed data units 240(1)-(M), client interface 210 interfaces clients such as local clients 215(1)-(N) and local clients 225(1)-(N) to framer 220. Client interface 210 includes a number of PDU formation units (depicted as PDU formation units 245(1)-(N)) which are under the control of a PDU formation control unit 250. PDU formation units 245(1)-(N) take as their input the packets from incoming datastreams 235(1)-(N), and form PDUs from the data contained therein. In controlling this process of PDU formation, PDU formation control unit 250 also provides information for inclusion in the PDUs thus generated. This information includes, for example, each client's client identifier and that client's data rate, among other such possible information.

The purpose of PDU formation units 245(1)-(N) is to generate PDUs at the provisioned data rate, unless framer 220 requests that PDU formation units 245(1)-(N) stop sending PDUs or requests additional PDUs. Since, in the case of a request to stop sending PDUs, this back-pressure is generated in the event that output bandwidth is insufficient, PDU formation units 245(1)-(N) typically provide some amount of client data storage to avoid client data loss during transient channel failures.

PDU formation units 245(1)-(N) receive client data and generate PDUs based on the data rate provisioned for that client. The provisioned client data rate can be smaller than the actual input data rate if the client is a data client (e.g., an ethernet datastream). For a client transmitting TDM data (e.g., a SONET datastream), the provisioned data rate should be equal to the incoming data rate. It will be noted that, for a TDM client, the actual outgoing PDU data rate is slightly greater than the input client data rate (e.g., output data rate= (519/512)*client data rate). This represents the additional PDU overhead (e.g., 7 bytes, in the posited case) that is added (e.g., for every 512 bytes of incoming client data bytes, in the posited case). Thus generated, the PDUs are provided to framer 220 for collection and distribution.

Framer 220 includes a number of input queues 255(1)-(N), which are coupled to a scheduler 260. Scheduler 260, under the control of a scheduling control unit 265, takes in the PDUs presented by input queues 255(1)-(N) and, using a scheduling methodology (e.g., strict-priority round-robin (SPRR) scheduling), scheduler 260 distributes PDUs to the various inputs of line interface 230 for use in the formation of framed data units. Among other such functions, scheduling control unit 265 controls an output PDU timer, the generation of sub-channel bitmaps, and channel capacity information.

Line interface 230 receives the scheduled PDUs at one of a number of frame formation units (depicted in FIG. 2 as frame formation units 270(1)-(M)). Frame formation unit 270(1)-(M), under the control of a frame formation control unit 275, receive PDUs from scheduler 260 of framer 220, and in turn, generate the framed data units that are presented to a network access unit (e.g., the network access unit to which transport unit 200 is coupled) as frame data units 240(1)-(M), for transmission (e.g., via core network 110). In addition to controlling the formation of frame data units 240(1)-(M), frame formation control unit 275 provides data rate and channel identification information to each of frame formation units 270(1)-(M), for use in the creation of frame data units 240(1)-(M), among other such possible information. In one embodiment, framed data units 240(1)-(M) are formatted as universal transport protocol frames, which can then be encapsulated into another format, such that the other format is compatible with the network access unit receiving the frames.

The purpose of frame formation units 270(1)-(M) is to receive PDUs from scheduler 260, form a UTP frame and send the UTP frame out at the UTP channel data rate. All frame formation units 270(1)-(M) should send out a UTP frame in unison. Frame formation units 270(1)-(M) receive PDUs from scheduler 260 and sends them out at the provisioned channel data rate. Frame formation units 270(1)-(M) send out a UTP frame overhead every N PDUs (N=303, for embodiments discussed herein, although it will be apparent that this number will change, based on the configuration of the given transport unit). In the event that there is no PDU, an empty PDU is generated and sent out.

Figure 3:
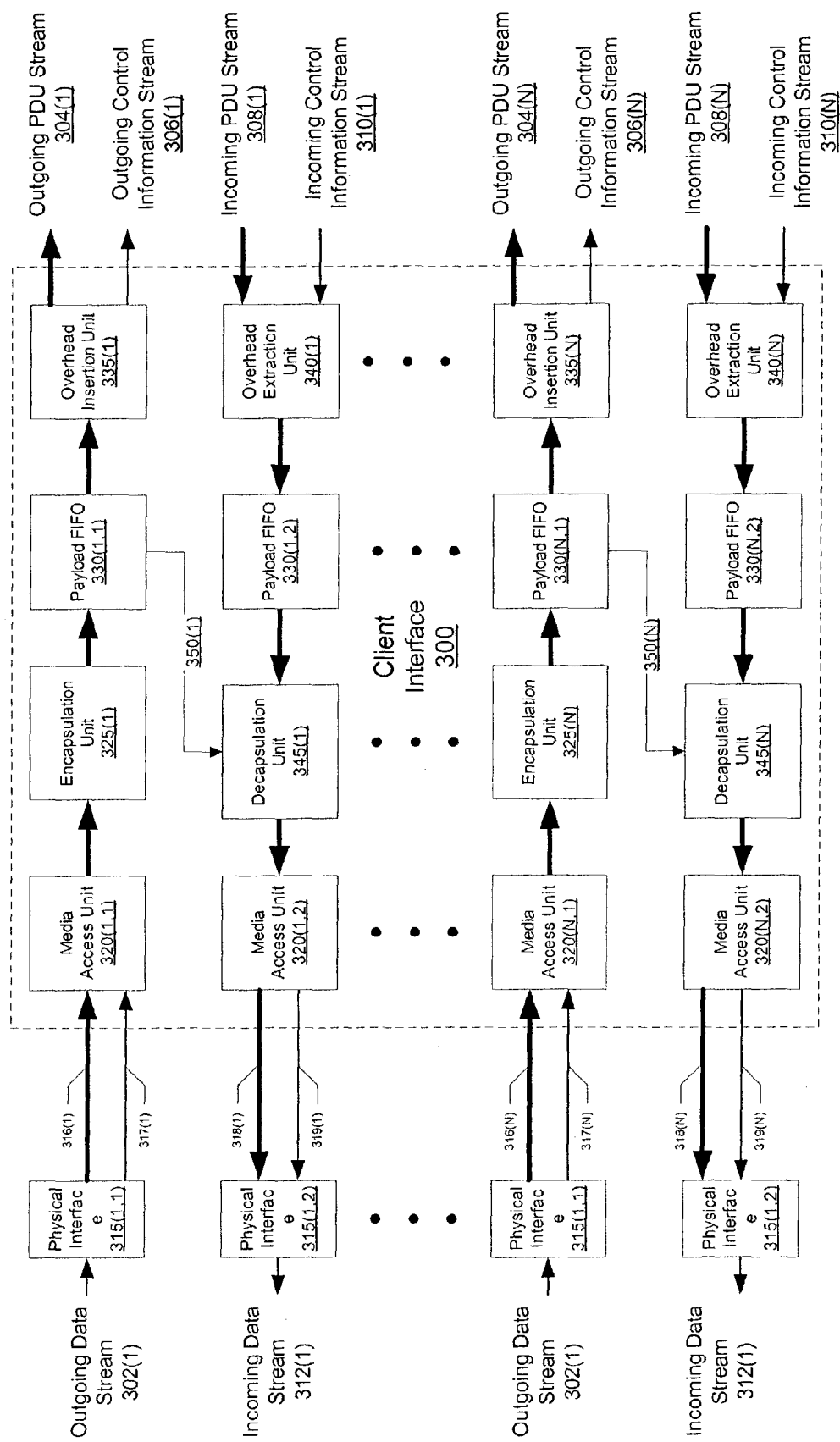
FIG. 3 is a block diagram illustrating in greater detail various portions of a client interface according to the present invention.

FIG. 3 is a block diagram illustrating in greater detail various portions of a client interface such as client interface 210. It should be noted that this depiction includes components used in both transmit side and receive side operations. A client interface 300 is depicted as receiving a number of outgoing datastreams (depicted as incoming datastreams 302(1)-(N)), and generating a number of outgoing PDU streams (depicted as outgoing PDU streams 304(1)-(N)), as well as generating outgoing control information (depicted as outgoing control information streams 306(1)-(N)), on the transmit side.

On the receive side, client interface 300 receives a number of incoming PDU streams (depicted as incoming PDU streams 308(1)-(N)), as well as incoming control information for each of these PDU stream (depicted as incoming control information streams 310(1)-(N)). As will be appreciated, each of outgoing PDU streams 304(1)-(N) has associated with it a corresponding one of outgoing control information stream 306(1)-(N), and in similar fashion, each of incoming PDU streams 308(1)-(N) has associated with it one of incoming control information streams 310(1)-(N). On the client side, data is sent out as outgoing datastreams 312(1)-(N).

As noted earlier, the inputs to client interface 300 are packetized data, while the output of client interface 300 is in the form of PDUs, which can be aggregated to form frame-based datastreams. Interfacing client interface 300 to the local clients attached thereto are a number of physical interfaces (depicted as physical interfaces 315(1,1)-(N, 2)). In the transmit direction, physical interfaces 315(1,1)-(N, 1) provide client data 316(1)-(N) and related control information 317(1)-(N), to client interface 300. In the receive direction, physical interfaces 315(1, 2)-(N, 2) receive client data 318(1)-(N) and related control information 319(1)-(N), from client interface 300.

In order to translate between client data and payload data units (and vice versa), client interface 300 provides a number of modules. On the transmit side, client interface 300 receives client data 316(1)-(N) and control information 317(1)-(N) at a number of media access units (depicted correspondingly as media access units 310(1,1)-(N,1)). It will be noted that, on the receive side, media access units 310(1,2)-(N,2) provide client data 318(1)-(N) and control information 319(1)-(N) to physical interfaces 315(1,2)-(N,2). Media access units 310(1,1)-(N,2) provide functionality such as support for the physical coding sub-layer and media access control. Media access units 310(1,1)-(N,1) are, in turn, coupled to encapsulation units 325(1)-(N).

In one embodiment, in order to allow a transport unit receiving such data to delineate the packets contained therein, encapsulation unit 325(1)-(N) encapsulate the client data presented to them by media access units 320(1,1)-(N,1). Encapsulation unit 325(1)-(N), in one embodiment employ encapsulation per ITU recommendation X.86 (Ethernet over SONET), which provides for the encapsulation of 802.3 MAC frames in a sub-layer level address and control frame (e.g., LAPS). Once encapsulated, the client data is sent from one of encapsulation units 325(1)-(N) to a corresponding one of payload FIFO 330(1,1)-(N,1). Payload FIFOs 330(1,1)-(N,1) buffer a client data in preparation for the insertion of overhead information, and so, the completion of PDU formation. Subsequent to buffering and payload FIFOs 330(1,1)-(N,1), the encapsulated data is then combined with PDU overhead information by overhead insertion units 335(1)-(N), in order to generate outgoing PDU streams 304(1)-(N), respectively, as well as related outgoing control information streams 306(1)-(N).

Conversely, on the receive side, client interface 300 first extracts overhead information from the incoming PDU. This is depicted in FIG. 3 by the receipt of incoming PDU streams 308(1)-(N) and incoming control information streams 310(1)-(N) by corresponding ones of overhead extraction units 340(1)-(N). Overhead extraction units 340(1)-(N) take in incoming PDUs and extract the overhead information therefrom, for use in processing the PDUs. Overhead extraction units 340(1)-(N) provide the stripped PDUs to payload FIFOs 330(1,2)-(N,2) for buffering prior to the stripped PDUs' decapsulation.

Decapsulation units 345(1)-(N) receive the stripped PDUs and perform decapsulation using a methodology such as ITU recommendation X.86. Information inserted by the encapsulation unit 325 include information such as start-of-MAC-frame and end-of-MAC-frame, which is used by the decapsulation units 345(1)-(N) to extract the incoming MAC frame. This information is provided by payload FIFOs 330(1,1)-(N,1), and is depicted as control information 350(1)-(N). Decapsulation units 345(1)-(N) provide the now-decapsulated and stripped PDUs representing incoming client data to media access units 320(1,2)-(N,2). From this information, media access units 320(1,2)-(N,2) generate client data 318(1)-(N) and control information 317(1)-(N), and provide this information to physical interfaces 315(1,2)-(N,2). In turn, physical interfaces 315(1,2)-(N,2) generate outgoing datastreams 312(1)-(N), for consumption by local clients such as local clients 115(1)-(N) or local clients 125(1)-(N).

Figure 4A:
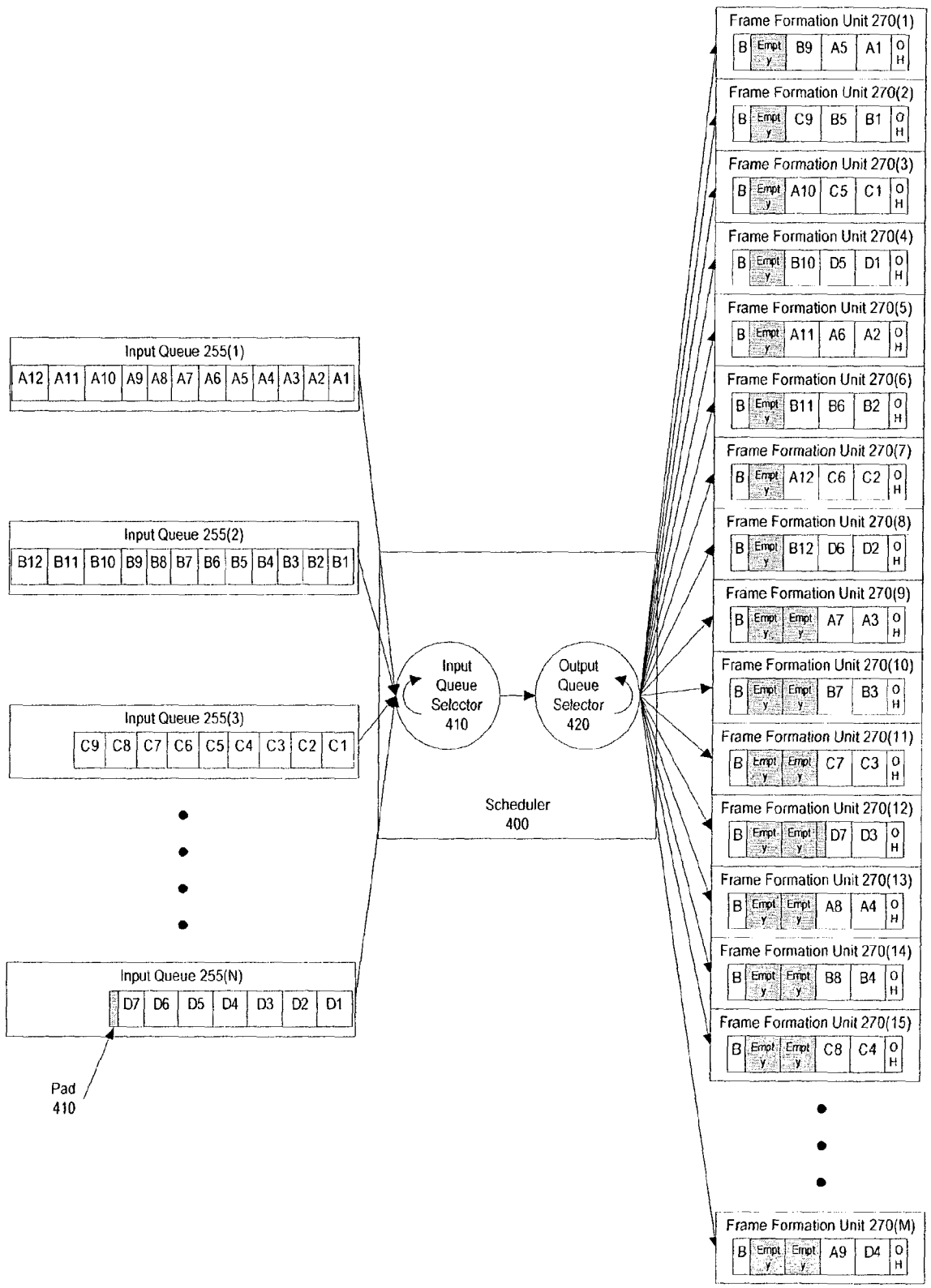
FIG. 4A is a block diagram illustrating an example of the operation of a framer according to the present invention.

FIG. 4A is a block diagram illustrating an example of the operation of framer 220. As previously noted, input queues 255(1)-(N) are coupled to a scheduler 400 (an example of scheduler 260), which is, in turn, coupled to frame formation units 270(1)-(M). In FIG. 4A, portions of framer 220 and line interface 230 are shown in further detail, and include scheduler 400, which can be configured, for example, to implement a strict-priority round-robin technique for both taking input from input queues 255(1)-(N), as well as for distributing payload data units to frame formation units 270(1)-(M). Scheduler 400 includes an input selector 410 and an output selector 420. Input selector 410 couples a selected one of input queues 255(1)-(N) to output selector 420. In a similar fashion, output selector 420 couples the output of input selector 410 to a selected one of frame formation units 270(1)-(M).

In one embodiment, scheduler 400 implements a strict-priority round-robin (SPRR) technique for PDU collection and distribution. The purpose of scheduler 400 is to collect PDUs from each of its inputs (i.e., input queues 255(1)-(N)) in strict round-robin priority, starting with clients' PDUs with the highest priority, and distribute these PDUs to the active channels (i.e., frame formation units 270(1)-(M)) in strict round-robin fashion at every output PDU time. In the event that the available output bandwidth is less than the total input client bandwidth, this module requests that those of PDU formation units 245(1)-(N) of the appropriate priority inputs stop sending PDUs. This back-pressure decision is made based on a maximum fill watermark per PDU queue. The functions in this block can be further described as two sub-functions performed at every output PDU time (where an output PDU time=output UTP frame time/number of PDUs per frame).

Per Priority Strict Round Robin PDU Collection Process: Input selector 410 receives PDUs from PDU formation units 245(1)-(N) via input queues 255(1)-(N), at the data rates that are individually set per client. These PDUs are buffered in input queues 255(1)-(N), as noted. At every output PDU time, PDUs are collected from input queues 255(1)-(N) in strict round-robin fashion starting with the highest priority ones of input queues 255(1)-(N). The last one of input queues 255(1)-(N) served in each priority is saved at every output PDU time. Then, at the next output PDU time, PDU collection is started from where it left off during the last PDU collection event. Thus, all the inputs are equally served at all times in all priorities. The number of PDUs collected is equal to the UTP group capacity information that is calculated from the UTP group information that is received from the far-end receive side. The UTP group capacity is calculated as:

$$Grp\_Cap = Ch\_Links\_Rcvd \times Ch\_Rate\_Basis^{(Ch\_Rate\_Rcvd-Ref\_Rate\_Num)}$$

Strict Priority Round Robin PDU Distribution Process: At every output PDU time, output selector 420 distributes the client PDUs collected to the output channels (i.e., frame formation units 270(1)-(M)) that are indicated as active by the sub-channel bitmap received from the far-end receive side. If the number of PDUs to be sent is less than the number of active sub-channels, empty PDUs are sent to the remaining channels. The last channel to which a client PDU was sent is saved at every PDU distribution event such that the PDU distribution starts from the next channel at the next PDU distribution event. In order to communicate information, regarding the first channel to which a client PDU was sent, to the receive side, the SPRR start bit of the first client PDU distributed by this block is set (this field is described later, in connection with FIG. 8).

In one example, the number of input queues (N) is equal to four (4), and the number of frame formation units (M) is sixteen (16). Each of the blocks of data in input queues 255(1)-(N) are designated by a letter indicating in which of input queues 255(1)-(N) the data block had been stored, and a number indicating its position in the given input queue. In a similar fashion, the generation of frames and their storage in frame formation units 270(1)-(M) are shown. It will be noted that the last data block in input queue 255(N) (designated D7) is a partial data block and includes a pad 430.

Figure 4B:
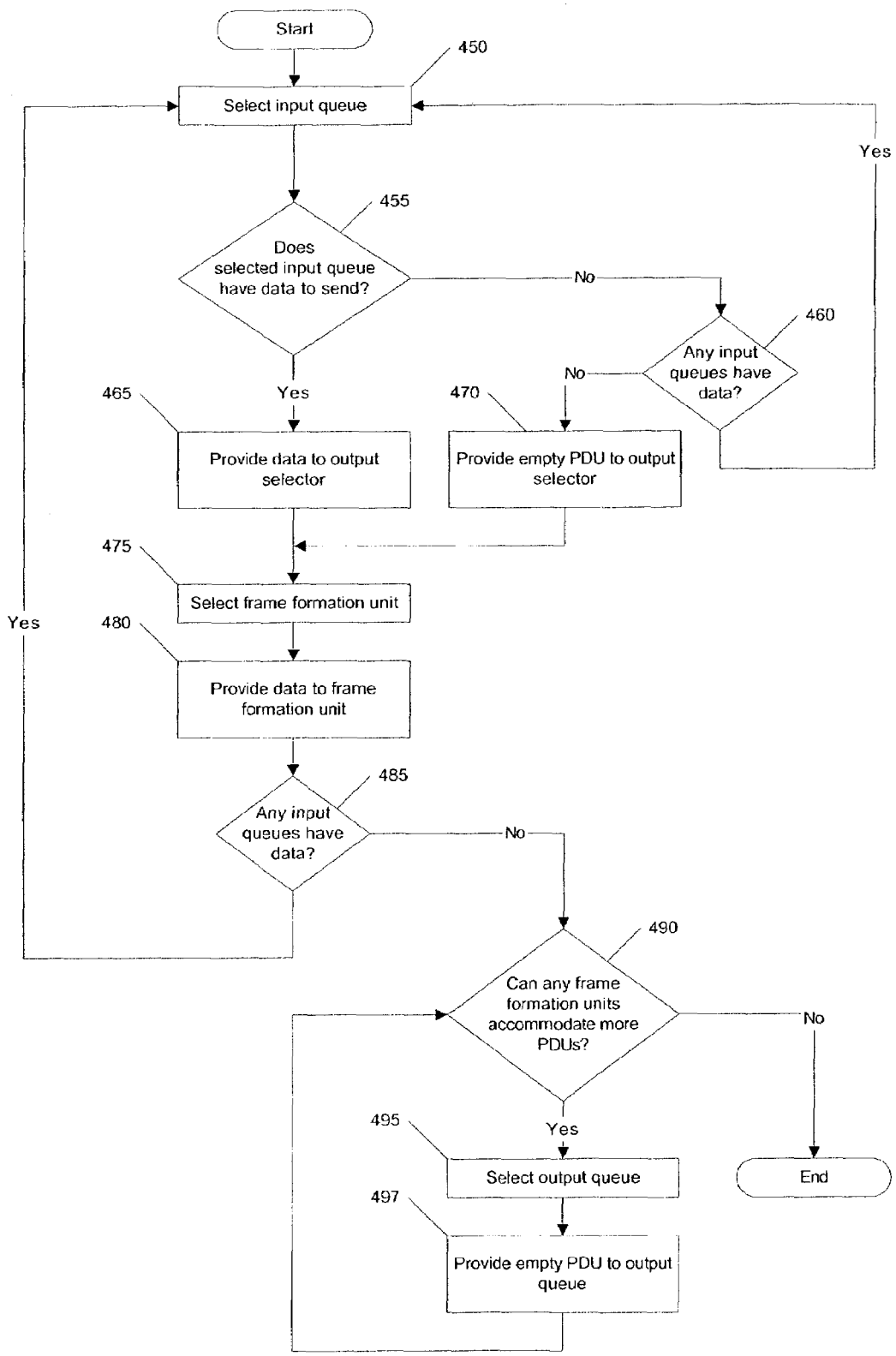
FIG. 4B is a flow diagram of a process of generating frames according to the present invention.

FIG. 4B is a flow diagram of a process of generating frames from the blocks of data depicted in FIG. 4A, using as an example the previously-mentioned round-robin technique, can be constructed as follows. The process of creating frames from input data blocks begins with the selection of the input queue by scheduler 400 (step 450). A determination is then made as to whether the selected input queue contains data (step 455). If other of the input queues contain data, the process selects another input queue to examine (steps 460, 450 and 455). If the selected input queue contains data, that data is provided to the output selector (step 465). However, if neither the selected input queue nor any of the other input queues contain data, an empty payload data unit is provided to the output selector (e.g., pad 430) (step 470). The output selector selects the frame formation unit to which the data should be sent (step 475) and provides that data to the selected frame formation unit (step 480). If any of the input queues contain data, another of the input queues is selected (step 485). Otherwise, a determination is made as to whether any of the frame formation units can accommodate additional PDUs (step 490). If such is the case, one of the remaining frame formation units is selected (step 495) and an empty PDU is provided to that output queue to pad the frame in question (step 497). This process continues until all the frame formation units have been served.

Scheduler 400 is responsible for building PDUs from the input data taken from various ones of input queues 255(1)-(N). Scheduler 400 preferably provides the following functionalities:

1. Minimize PDU fragmentation (i.e., partial PDUs);

2. Ensure fair output bandwidth sharing between all input ports Linder normal and degraded conditions;

3. Ensure fair bandwidth sharing between inputs, irrespective of input traffic type (packet/cell/TDM stream), traffic profile (packet size distribution), interface size and speed, and the like.

In one embodiment, an internally generated PDU_COLLECT event is employed. This event is generated at every input PDU interval (i.e., the time required to send a single PDUs worth of data on the output port). Such an implementation assumes that all the output ports have the same maximum data rate.

At each PDU_COLLECT event, input queues 255(1)-(N) are scanned in a round-robin fashion, and a PDU (either full or partial) is collected from each non-empty input queue. This is contingent upon an output queue (i.e., one of frame formation units 270(1)-(M)) is available for the given PDU.

As noted, FIG. 4B depicts a flow diagram illustrating a process according to one embodiment of the present invention, as do other figures described herein. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, and the like. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 5:
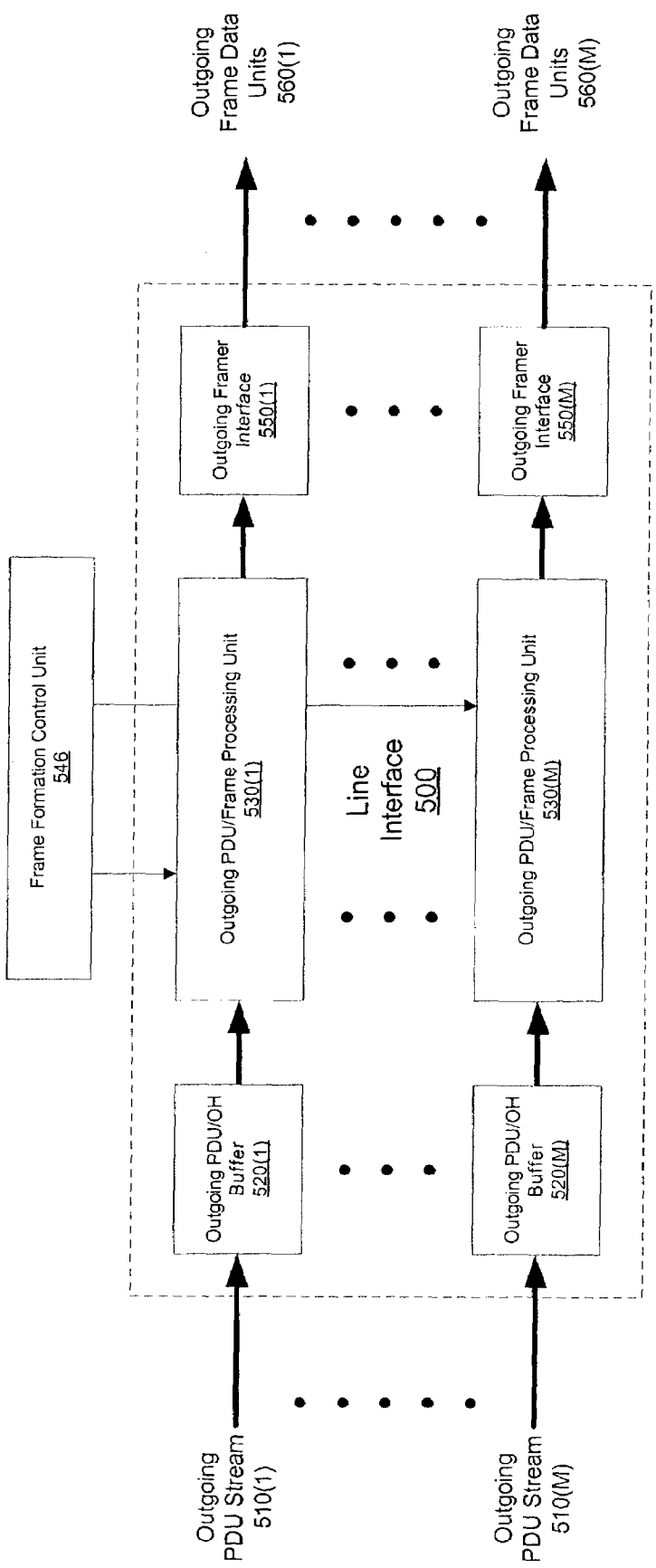
FIG. 5 is a block diagram illustrating an example of line interface according to the present invention.

FIG. 5 is a block diagram illustrating an example of line interface 230, and depicted in FIG. 5 as a line interface 500. It will be noted that line interface 230 and line interface 500 depict only the transmit side of a line interface, and that a corresponding receive side interface would be required for duplex communication (and is described subsequently with regard to FIG. 10). Line interface 500 takes as its input a number of outgoing PDU streams (depicted as outgoing PDU streams 510(1)-(M)). Each of outgoing PDU streams 510(1)-(M) is received by an outgoing PDU/overhead (OH) buffer (depicted as outgoing PDU/OH buffers 520(1)-(M)). Outgoing PDU/OH buffers 520(1)-(M) buffer the outgoing PDUs to allow for timing variations in reception of the PDUs from scheduler 260, and also for the processing of those PDUs within line interface 500. The buffered PDUs are then passed to one of outgoing PDU/frame processing units 530(1)-(M). Under the control of a frame formation control unit 540, outgoing PDU/frame processing unit 530(1)-(M) perform processing on the outgoing PDUs, including the appropriate modification of the PDUs and frame overhead, as well as the addition of stuff bytes as may be needed for the control of incoming and outgoing data rates. The outgoing PDU/Frame Processor unit inserts UTP frame overhead after every N outgoing PDUs (where N=303, in the implementation depicted here). In the UTP frame overhead, information such as a channel identifier, a frame count, certain error information (indicating conditions such as Loss-of-Frame (LOF), Loss-of-Signal (LOS), and the like), and the like is added. After the UTP frame overhead information is added, the resulting CRC across the overhead bytes is added to the end of the overhead information.

Once the PDUs have been properly formed into frames, this now-framed data is passed to one of outgoing framer interfaces 550(1)-(M), which provide a physical interface for the transmission of the framed data. It should be noted that outgoing framer interfaces 550(1)-(M) can be configured to produce framed data using a variety of frame-based protocols, and in fact, can be configured to support multiple frame-based protocols (either selectively, over one of the outgoing framer interfaces, or simultaneously, with various ones of outgoing framer interfaces 550(1)-(M) supporting various ones of a number of frame-based protocols). This framed data appears at the outputs of outgoing framer interfaces 550(1)-(M) as a corresponding one of outgoing frame data units 560(1)-(M) (which correspond to frame data units 240(1)-(M) of FIG. 2).

Figure 6:
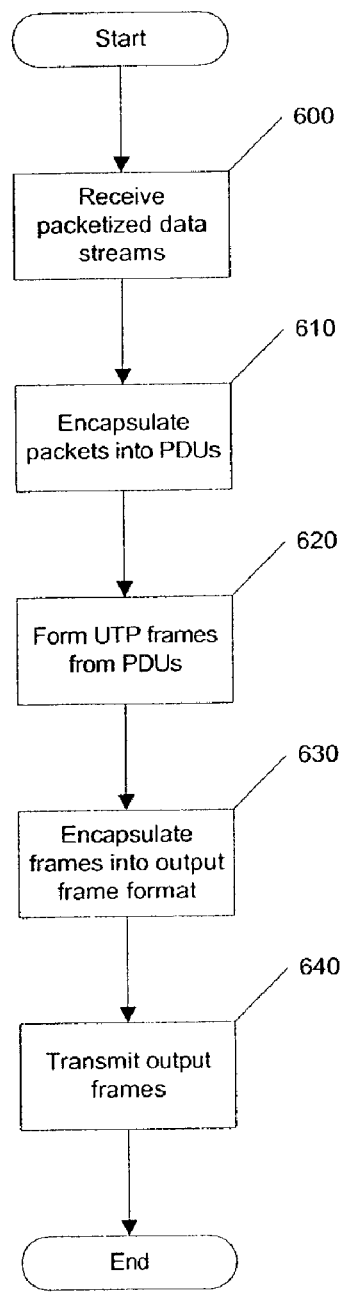
FIG. 6 is a flow diagram illustrating a process of converting a packetized data stream into data frames according to embodiments in the present invention.

FIG. 6 is a flow diagram illustrating an overall process of converting a packetized data stream into data frames according to embodiments in the present invention. The process begins with the reception of a packetized data stream (e.g., at an interface such as client interface 210) (step 600). Next, the packetized data is encapsulated into PDUs (e.g., again, by an interface such as client interface 210) (step 610). Once the PDUs have been formed, UTP frames are formed from the PDUs (step 620). This function includes distributing the PDUs among the PDU streams that will be used to form the UTP frames (a function performed by, for example, framer 220), and forming the PDU streams thus generated into UTP frames (a function performed by, for example, line interface 230). The formation of the frames also include the actual encapsulation of the frames into the desired output frame format (step 630). This functionality is also provided by line interface 230, as more specifically detailed in line interface 500 by outgoing PDU/frame processing units 530(1)-(M). The output frames, having thus been formatted, are now ready for transmission (step 640).

FIG. 7 is a block diagram illustrating a UTP frame according to embodiments of the present invention. Frame 700 includes overhead information 710 as well as a payload 720. Payload 720 can be further divided into a number of PDUs (depicted in FIG. 9 as PDUs 730(1)-(N)). The format of overhead information 710 and PDUs 730(1)-(N) are now discussed in greater detail with respect to FIGS. 8 and 9, respectively.

FIG. 8 is a block diagram illustrating an example of the fields within overhead information 710 according to the embodiment of the present invention. As depicted in FIG. 8, overhead information 710 includes a start-of-frame (SOF)

800, a group identifier field 805, a channel identifier field 810, a frame count field 820, a protocol version field 825, a communication channel field 830, a channel bitmap 835, an error control field 840, a channel capacity field 845, an alternate channel information field 850, an expansion area 855, and an error condition information field 860. The purpose and use of each of these overhead information field is now described.

In one embodiment of the present invention, SOF 800 is 2 bytes, and allows the receiving transport unit (e.g., receive side) to synchronize on the incoming sub-channel frame. In one embodiment, the first byte transmitted is 0xAA, while the second byte transmitted is 0xA5, and the SOF sequence is not scrambled before transmission.

The function of group identifier field 805 is to allow the receiving transport unit to verify that the connection (for the group of sub-channels) is received from the intended transmitting transport unit. This feature is important in backbone network applications, as a result of the difficulties in tracing the physical path of all the channels through a network. This is particularly important because the separation between the receiving and transmitting transport units is often substantial (e.g., 1000 km or more) with several transport network elements between them. In one embodiment, the value of group identifier field 805 is between 0 and 65536, with a channel identifier of 0x0000 being reserved for AIS frame. An AIS frame has basic frame information in its overhead, with all the PDUs being empty. To allow the user to maintain connection accuracy across the network, each UTP group in the network can be provisioned with a different group identifier (up to a maximum of $2^{16}$=65536). At "Power ON," group identifier field 805 is initialized by the system control software.

Channel identifier field 810 includes a channel identifier (the 7 LSBits) and an active indicator bit (the MSBit). The function of channel identifier field 810 is to allow the receiving transport unit to identify individual channels within a UTP group. Channel identifier field 810 also indicates the round-robin sequence in which the payload units are distributed across the individual channels, allowing the receiving transport unit to accurately extract the payload. The active bit is set by the transmitting transport unit when the transmitting transport unit receives a bitmap from the far-end receiving transport unit, indicating that the sub-channel is tested and can be used. The transmitted active bits are a reflection of the received bitmap. When a sub-channel is indicated to be in use, the transmitting transport unit sends real data through the PDUs. Empty PDUs are sent when there is no data to be sent. The transmitting transport unit looks at the received bitmap every PDU time. If any bit is cleared, the transmitting transport unit sends an empty PDU immediately following the change. However, if any bit is set, the transmitting transport unit begins sending user data in the frame following setting the active bit.

Channel identifiers preferably start at 0 and proceed in ascending order, increasing up to the maximum number of channels supported by the transport unit. A maximum of 128 sub-channels can be supported by a 7 bit channel identifier field. Although a 7 bit channel identifier can support up to 128 channels, only 0 through 63 channels are valid in one embodiment of the present invention, as a result of the 64 bit channel bitmap that is used for channel protection.

Frame count field 820, which is 4 bytes in length in some embodiments, functions to maintain a count of the number of frames transmitted since power on or the last counter rollover. The frame count stored in frame count field 820 is also used to synchronize and de-skew the active sub-channels within a UTP group before the payload is extracted.

A 4 byte frame count can count up to 4,294,967,296 consecutive frames before rolling over. This corresponds to approximately 149.131 hours at a 10 Gb/s frame transmission rate. In one embodiment, the most-significant byte of the frame counter is the first byte to be transmitted, while the least-significant byte of the counter is the last byte to be transmitted. Preferably, all channel frames are generated and transmitted by the transmitting transport unit at the same clock. That being the case, all the channel frames leaving the transmitting transport unit at any time should have the same frame count.

Protocol version field 825 stores a protocol version number (e.g., 2 bytes), the function of which is to allow changes to be made to the protocol (e.g., to OH, as well as to the PDU structure) in order to adapt the original protocol either for optimization to an application (e.g., DS3 sub-channel rate versus 10 Gb/s sub-channels) or to add functionality to handle newly identified scenarios. The scenario indicated by the information stored in protocol version field 825 can be used to keep a track of such changes, as they are needed. Initially, the value stored in protocol version field 825 indicates a version level of 0. Changes to the protocol can be tracked by keeping a separate document per version that details the OH and PDU definitions of that version. This document should also have a description of any new mechanisms related to the changes made.

Communication channel field 830, which can also be referred to as user accessible bytes (UAB) (e.g., 4 bytes), allow a transport unit's user to send and receive information to and from a remote network element. In one embodiment, the bytes of communication channel field 830 are defined as follows. The first byte transmitted is the most-significant byte of the message, followed by succedingly less-significant bytes. These bytes are accessible directly through registers within the transmit and receive sides of a transport unit. The user can elect to send different information on each sub-channel or the same information on all the channels depending on the protection needs of the given application.

Channel bitmap 835, which can also be referred to as a local receive channel bitmap (e.g., 8 bytes), provides the following functions. Generated by the local transport unit's receive side to indicate to the far-end transport unit's transmit side which of the channels are error-free and within skew limits, and which are not. This is a way to implement individual channel level fast protection and restoration at layer one of the networking protocols. This also allows the user of such systems to manually provision or de-provision a channel as needed.

The definition of the bits used in channel bitmap 835 are as follows. In one embodiment, a 64 bit bitmap is used, with the most-significant bit of the first byte corresponding to a channel identifier of 63, and successively less-significant bits representing successively lower channel identifiers, down to the least-significant bit corresponding to a channel identifier of 0. In this case, the most-significant bit of the first byte is transmitted first and successively less-significant bits transmitted thereafter, in order of decreasing significance.

In operation, a network according to the present invention provides the following features. An error on a received channel is indicated to the far-end transmitting transport unit by clearing the corresponding bit in the bitmap. It will be noted that the bitmap carried on all the channels should be identical. This is done to ensure that the bitmap reaches the far-end transmitting transport unit even with only a single channel operational in the reverse direction. In the normal case, with multiple channels operational, the far-end receiving transport unit sends an authenticated bitmap to the adjacent transmitting transport unit. In one embodiment, the authenticated bitmap is generated by logically ANDing all the valid copies of the bitmap. At "Power ON," the first bitmap transmitted by the transmitting transport unit should be all zeros. The bitmap in the following frame is the one received from the receive side of the local transport unit as good frames per sub-channel are received. Each bit in the bitmap received from the receive side can be individually overridden by the user through dedicated registers. This feature allows the system user to manually take individual channels in and out of service (e.g., for repairs). In one embodiment, channel bitmap 835 (as a bitmap with up to 64 bits) supports only 64 channels (i.e., a channel identifier (Ch_Id)=0 to 63), while channel identifier field 810 can support up to 128 channels. Additional bytes can be added to overhead information 710 following the currently defined channel bitmap for use in supporting up to 128 channels (or more). It will be noted that channel identifiers that are not supported by the bitmap implemented should be considered invalid.

Error control field 840 includes error condition bytes (e.g., 2 bytes). The error condition bytes that are used to inform the transmit side of the far-end transmitting transport unit of error conditions seen by the receive side of the local transport unit. In one embodiment, the first 2 bytes transmitted following channel bitmap 835 are the first 2 bytes of error control field 840. The transmission order and bits representing error conditions are as given in Tables 1 and 2.

In one embodiment, the PRCap_Rate byte is defined as follows. The most-significant nibble of the PRCap_Rate byte is the user configured nibble representing the data rate of the originating transport unit's (transmit side) channels. If the next transport unit is a regenerating transport unit, this nibble is used to define the most-significant nibble of the outgoing PRCap_Rate byte representing its output channel data rate. The least-significant nibble of the PRCap_Rate byte is the rate information generated by the local transport unit (receive side) or regenerating transport unit to be used by the far-end transport unit.

The PRCap_Links byte carries the number of working channels verified by the local receive side of the regenerating transport unit. This is also equal to the number of bits set in the corresponding channel bitmap (channel bitmap 835) generated by the receiving transport unit or regenerating transport unit. Preferably, the PRCap_Rate nibble generated by the given receive side is initialized to [0000] and the PRCap_Links is initialized to 0.

TABLE 1

Layout of the first error condition byte.

| Bit 7 (MSB) | Bit 6 | Bit 5 | Bit 4 | Bit 3 | Bit 2 | Bit 1 | Bit 0 (LSB) |
|---|---|---|---|---|---|---|---|
| CH_ID Error | Channels excluded due to excess skew | RDI in response to AIS frame received | CRC Error Degradation beyond threshold | Loss-of-Signal (LOS) | Loss-of-Frame (LOF) | BER Degradation beyond threshold | Forced/Manual Switch |

TABLE 2

Layout of the second error condition byte.

| Bit 7 (MSB) | Bit 6 | Bit 5 | Bit 4 | Bit 3 | Bit 2 | Bit 1 | Bit 0 (LSB) |
|---|---|---|---|---|---|---|---|
| Unused | Unused | Unused | Unused | Unused | Unused | Unused | CH_ID Error |

In the embodiment described above, if more than one channel has distinct error conditions such as a BER degradation beyond threshold and LOS, the error condition bits do not resolve which of the channels has BER degradation and which one has LOS. This could be remedied by encoding such information and conveying that encoded information within overhead information 710, but this would consume bandwidth and reduce the frame structure's efficiency. Typically, the error condition bytes are generated only for those sub-channels that are provisioned to be active at the receive side of the receiving transport unit. This is to avoid standing alarms in the error condition bytes even when some of the channels are not used/connected.

Channel capacity field 845, also referred to as UTP group capacity bytes (e.g., 2 bytes), which includes a primary capacity rate byte (a PRCap_Rate byte (1 byte)) and a primary link capacity byte (PRCap_Links byte (1 byte)). The function of channel capacity field 845 is as follows. In the case where a regenerating transport unit is used to translate between two back-to-back UTP groups with different data rates (per channel data rates; e.g., translation between 4×10 Gb/s and 5×2.5 Gb/s datastreams). The UTP group capacity bytes within channel capacity field 845 inform the originating transmit transport unit about the smallest capacity in the regenerated spans.

Alternate channel information field 850, which carries alternate channel protection information (ACPI), is 25 bytes of information, in one embodiment. The function of the ACPI carried by alternate channel information field 850 is to carry the channel bitmap, UTP group capacity information and the error condition bytes of an alternate UTP group, for use if the UTP group in the return direction is not available. The alternate UTP group that the protection and UTP group capacity information belongs to is indicated by an alternate Grp_Id_Alt field. The path of the alternate UTP group protection information is transferred between the primary and alternate UTP groups via the local and far-end system controllers (universal transport system controllers (UTSCs)).

Depending upon the implementation and the difference in the transmission delays of the two UTP groups, the arrival of the bitmap at any transmit side of a transport unit via the alternate UTP group can be delayed by multiple frames. The channel bitmap (channel bitmap 835) received by a transmit side of a transport unit via the alternate UTP group can also be used to authenticate the channel bitmap received from the receive side during normal operation.

Expansion area 855 can include expansion bytes, to be used for future expansion of the currently defined bytes, as well as unused bytes. These unused bytes can be used as proprietary bytes during implementation, or defined later to satisfy new requirements. Also provided is error condition information field 860, which allows for the storage of error detection/correction information (e.g., CRC 32 information, 4 bytes in length). This can be, for example, a CCITT standard CRC calculated over the frame header bytes with a divisor 0x04C11DB7 and initial remainder=0xFFFFFFFF.

FIG. 9 is a block diagram illustrating a format of a PDU according to one embodiment of the present invention. A PDU 900 is depicted as including a number of fields in addition to client data 910, termed collectively as a PDU overhead section 915. The fields of PDU overhead section 915 include a client identifier field 920, an extension field 930 (which includes a client identifier extension field 932, an SPRR start bit 934, a data length field 936 and a sequence number field 938), a PDU sequence number field 940, a data length field 950 and a header error control (HEC) field 960. Also included in PDU 900 is a bit parity information field 970.

In one embodiment, every PDU includes up to 512 bytes of payload data encapsulated by a PDU overhead section (e.g., PDU overhead section 915) at the head of the PDU, and a parity byte (bit parity information field 970) at the tail of the PDU. The direction of transmission implies that the first byte of the PDU overhead is the first byte of a PDU that is transmitted and the PDU's parity byte is the last byte that is transmitted. While, in an embodiment such as is described herein, a fairly elaborate PDU overhead is defined to accommodate the functionality across several UTS implementations, need not be the case. The use of a flexible PDU structure makes the interoperability of a variety of transport unit architectures easier by managing PDU streams based on their client identifiers. Therefore, as far as possible, it is preferable to use a standardized PDU definition across all available protocol versions that are optimized for a particular application (e.g., access applications may require a smaller number of PDUs per frame with some variations in overhead information 710). The definitions of the fields that are included in PDU overhead section 915, as well as their functions, are now discussed.

In one embodiment, client identifier field 920 plus the 4 most-significant bits of extension field 930 form the PDU's client identifier (Client_ID). This large number of client IDs (>1 million, when client identifier field 920 is two bytes in length) are meant to uniquely identify each client going through all the transport units in a network. Since an objective is to allow various implementations of the transport unit architecture (for example, in access, metro and core products) to interoperate, a large number of client IDs are preferable to identify a client that may come into a UTS network at any point (e.g., a client with a Client_ID=20 may enter a network through a transport unit providing basic network access, while a client with a Client_ID=65000 may enter the network through a transport unit providing core access). An example of reserved Client_IDs is given in Table 3.

TABLE 3

Reserved Client_IDs.

| Client_IDs | Reserved As | Usage Notes |
| --- | --- | --- |
| All 0s (20 bits) | Empty PDU | This Client_ID is used to indicate an empty PDU that does not belong to any client. An empty PDU is inserted into a CCP channel during a PDU distribute interval if there aren't enough client PDUs to send. |

TABLE 3-continued

Reserved Client_IDs.

| Client_IDs | Reserved As | Usage Notes |
| --- | --- | --- |
| All 1s (20 bits) | Management PDU | This Client_ID is used to indicate a PDU that contains a management message sent by the local management system to the remote system. |

In one embodiment, the least-significant bit of extension field 930 plus PDU sequence number field 940 form a 9-bit PDU sequence number (Sequence_Num). In such an arrangement, the least-significant bit of the Sequence_Num is bit 0 of extension field 930. This sequence number indicates the sequence number of the PDU within a frame. In this embodiment, the first PDU of every frame starts with Sequence_Num=0. The use of sequence numbers allows faster frame synchronization per channel. The use of sequence numbers allows faster synchronization because PDU sequence numbers allow channel synchronization to be achieved in a few PDU times as opposed to a few UTP frame times. This mechanism can also be used to check the integrity of PDUs as the PDUs are transferred from one channel to another in a core application.

In one embodiment, SPRR start bit 934 is the third bit in extension field 930. SPRR start bit 934 is used to guarantee that the payload is regenerated in the original sequence when SPRR distribution with even distribution across all active channels is implemented. Optionally, if at every PDU distribution cycle, the data PDUs are distribution starting from sub-channel 0, then this bit is not used. In the SPRR distribution scheme with even distribution across all active channels, SPRR start bit 934 indicates the first data PDU that is sent during a PDU distribute cycle. SPRR start bit 934 is then used by the receive side of a transport unit to determine from which sub-channel the SPRR PDU extraction should begin.

Data length field 936 and data length field 950 of the PDU's data length, with bits 1 and 2 of extension field 930 forming the two least-significant bits of the data length, and data length field 950 forming the most-significant byte. The PDU's data length is equal to, and the data length fields indicate, the number of client data bytes in the 512-byte PDU payload area starting from the first byte after HEC field 960.

HEC field 960 contains header error control information. This HEC information can be generated, for example, in a manner such as that used in generating the HEC information for the asynchronous transfer mode (ATM) protocol. Such a correction code allows error checking with 1 bit correction of the Client_ID, extension byte and sequence number fields of the PDU overhead.

Bit parity information field 970 provides parity information for the PDUs payload. In one embodiment, bit parity information field 970 is the byte after the 512 byte PDU payload space (i.e., client data 910). Bit parity information field 970 sets odd parity across the 512 byte PDU payload space on a bit-by-bit basis (e.g., bit 0 of bit parity information field 970 sets an odd parity across the bit 0's of all the bytes in the PDU payload space).

Figure 10:
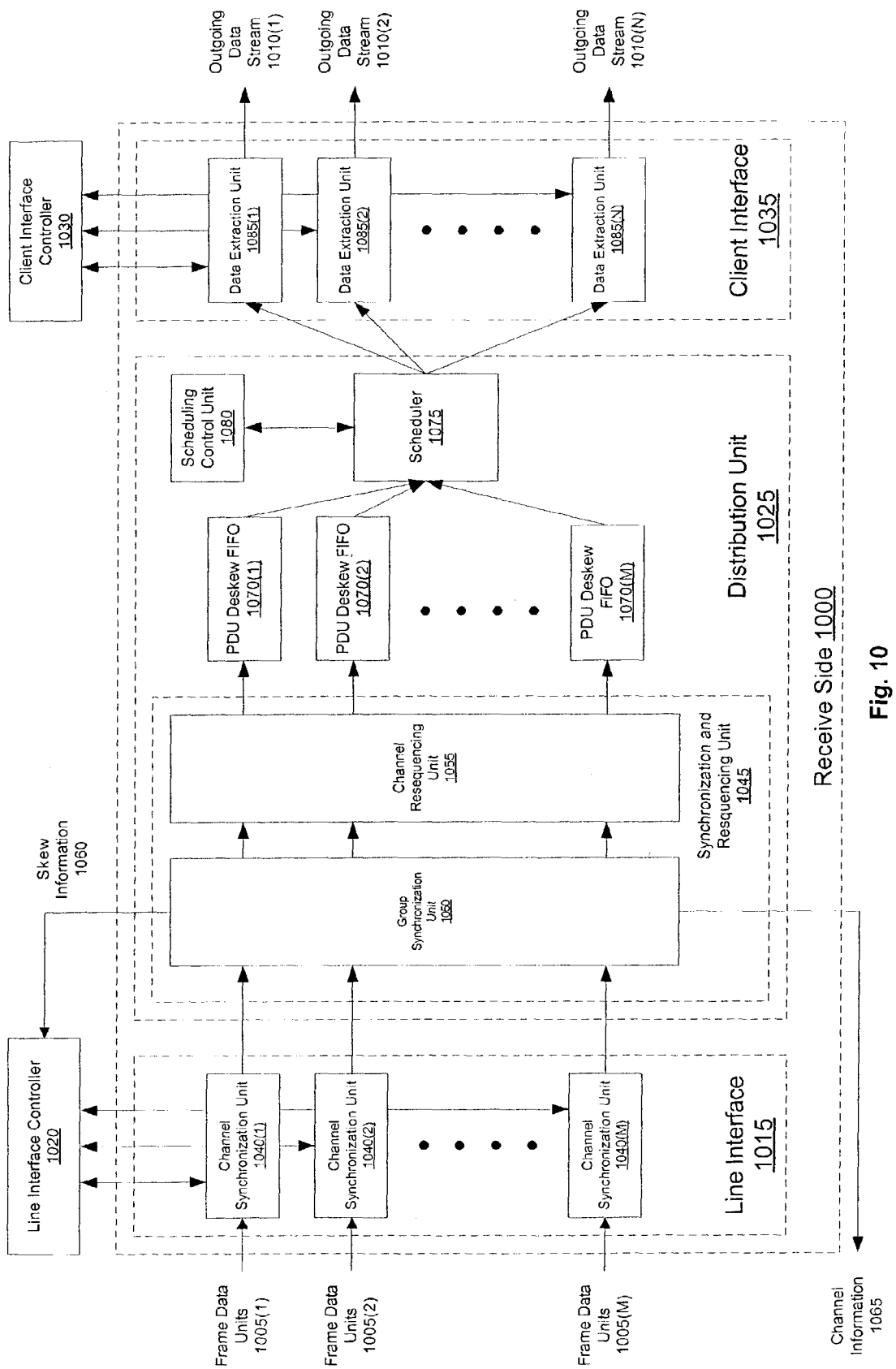
FIG. 10 is a block diagram illustrating a receive side of a transport unit according to embodiments of the present invention.

FIG. 10 is a block diagram illustrating a receive side 1000 of transport unit 200 depicting the modules used to convert framed data (received as frame data units 1005(1)-(M)) and provided to local clients as a packetized data stream (depicted in FIG. 10 as outgoing data streams 1010(1)-(N)). Receive side 1000 includes a number of sections that provide for this translation. These sections include a line interface 1015 (under the control of a line interface controller 1020), a distribution unit 1025, and, under the control of a client interface controller 1030, a client interface 1035.

Line interface 1015 includes a number of channel synchronization units (depicted in FIG. 10 as channel synchronization units 1040(1)-(M)), each of which is under the control of line interface controller 1020. The purpose of channel synchronization units 1040(1)-(M) is to identify and delineate the frame on a per channel basis. Channel synchronization units 1040(1)-(M) identify the incoming frame based on frame overhead (e.g., overhead information 710) as well as PDU overhead (e.g., PDU overhead section 915). Overhead information 710 is delineated using the SOF pattern (e.g., 0xAA followed by 0xA5) at the beginning of the frame and error condition information field 860 (e.g., CRC 32) after a standard delay (e.g., 76 bytes). The number of bytes in overhead information 710 can be different, based on version information in protocol version field 825. A state transition diagram for frame delineation using overhead information 710 is described subsequently, in connection with FIG. 14. Alternatively, information in PDU overhead section 915 can be used to reduce the time required for frame delineation and synchronization. A state transition diagram for frame delineation using PDU overhead section 915 is described subsequently, in connection with FIG. 15. Channel synchronization units 1040(1)-(M) also provide overhead information to line interface controller 1020. UTP overhead is sent to line interface controller 1020. In addition, information about errors such as channel identifier, group identifier, CRC information and so on is also sent to the line interface controller, allowing such information to be used in the processing of PDUs.

Once the frames received as framed data units 1005(1)-(N) are received and synchronized by channel synchronization units 1040(1)-(N), respectively, the incoming PDU streams are passed to distribution unit 1025, and more particularly, to a synchronization and resequencing unit 1045. Synchronization and resequencing unit 1045 includes a group synchronization unit 1050 and a channel resequencing unit 1055. When the PDU streams are passed to group synchronization unit 1050, group synchronization unit 1050 both synchronizes the PDUs based on their respective groups, but also generates skew information 1060 that is passed to line interface controller 1020 for use by channel synchronization units 1040(1)-(N) in synchronizing the incoming channels of framed data. Group synchronization unit 1050 also generates channel information 1065. Channel information 1065 includes sub-channel bitmap information, channel rate capacity, and channel link capacities. This information is provided to transmit side 205 for transmission to the distribution unit of the far-end transport unit. This supports the various error detection and error handling functionalities described with regard to the frame and PDU format discussed previously.

The purpose of synchronization and resequencing unit 1045 is to identify the largest group of channels having the same frame count and arrive within a specified skew time limit (measured in numbers of PDUs), and to forward these PDUs on for deskewing and distribution. Group synchronization unit 1050 receives the SOF arrival time and the frame counts from all the channels that are frame-synchronized. A state machine capable of finding and synchronizing on the largest group of channels that arrive within a specified skew window is described subsequently with regard to FIG. 16.

After group synchronization has been performed on the incoming PDU streams by group synchronization unit 1050, group synchronization unit 1050 passes the now-synchronized PDU streams to channel resequencing unit 1055. Channel resequencing unit 1055 resequences the PDUs in the incoming PDU streams in order to place the PDUs in the proper sequence for extraction. Channel resequencing unit 1055 sequences channels for the SPRR block based on the channel identifiers rather than the physical ports on which the channels arrive. This allows channels to be cross-connected between the transmit and receive ends, and still be recovered correctly.

After group synchronization and sub-channel resequencing by synchronization and resequencing units 1045, the PDU streams are passed to a corresponding one of PDU deskew FIFOs 1070(1)-(M). As their name implies, PDU deskew FIFOs 1070(1)-(M) perform deskewing on the frames that are presented at their input. By buffering the PDU streams, PDU deskew FIFOs 1070(1)-(M) allow for timing variances at their inputs, while also making PDUs available to a scheduler 1075 at the appropriate times. According to one embodiment of the present invention, scheduler 1075 performs PDU extraction using a strict-priority round-robin methodology under the control of a scheduling control unit 1080. Scheduling control unit 1080, among other functions, provides a channel data rate to scheduler 1075 that is used by scheduler 1075 (along with information from PDU deskew FIFOs 1070(1)-(M) (e.g., frame count per PDU information)) in extracting and distributing PDUs to client interface 1035. Under the control of client interface controller 1030, data extraction units within client interface 1035 (depicted as data extraction units 1085(1)-(N)) receive PDUs distributed by scheduler 1075 and extract the client data therein by decapsulating such data. This decapsulation by data extraction units 1085(1)-(N) results in outgoing data streams 1010(1)-(N).

Figure 11:
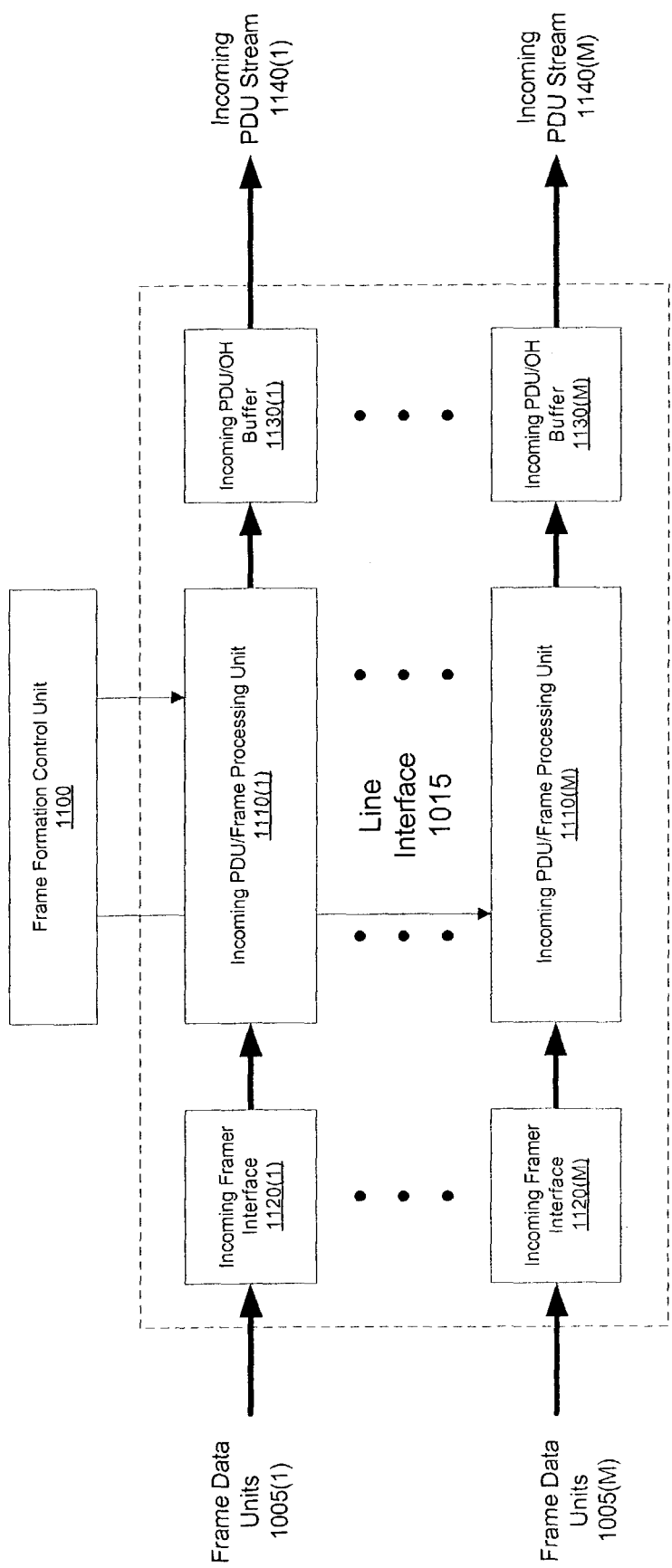
FIG. 11 is a block diagram illustrating the features of a line interface according to embodiments of the present invention.

FIG. 11 is a block diagram illustrating in greater detail the features of line interface 1015. As depicted in FIG. 11, line interface 1015 is controlled by a frame formation control unit 1100. Frame formation control unit 1100 is a more specific example of line interface controller 1020, in that frame formation control unit 1100 is tasked with controlling incoming PDU/frame processing units 1110(1)-(M). In operation, line interface 1015, as in FIG. 10, receives frame data units 1005(1)-(M). As depicted in FIG. 1, however, frame data units 1005(1)-(M) are received by incoming framer interfaces 1120(1)-(M), which interface the physical and logical framing protocols used to format frame data units 1005(1)-(M) to incoming PDU/frame processing units 1110(1)-(M). Incoming PDU/frame processing units 1110(1)-(M) perform incoming PDU/frame processing, which includes PDU and frame overhead synchronization and the extraction of certain information from the frames. This produces a PDU stream which is presented to a corresponding one of incoming PDU/OH buffers 1130(1)-(M). Incoming PDU/OH buffers 1130(1)-(M) buffer the incoming PDU streams to allow for variations in the time required by processing performed by line interface 1015. Incoming PDU/OH buffers 1130(1)-(M) of line interface 1015 present the PDU streams to distribution unit 1025 as incoming PDU streams 1140(1)-(M).

Figure 12A:
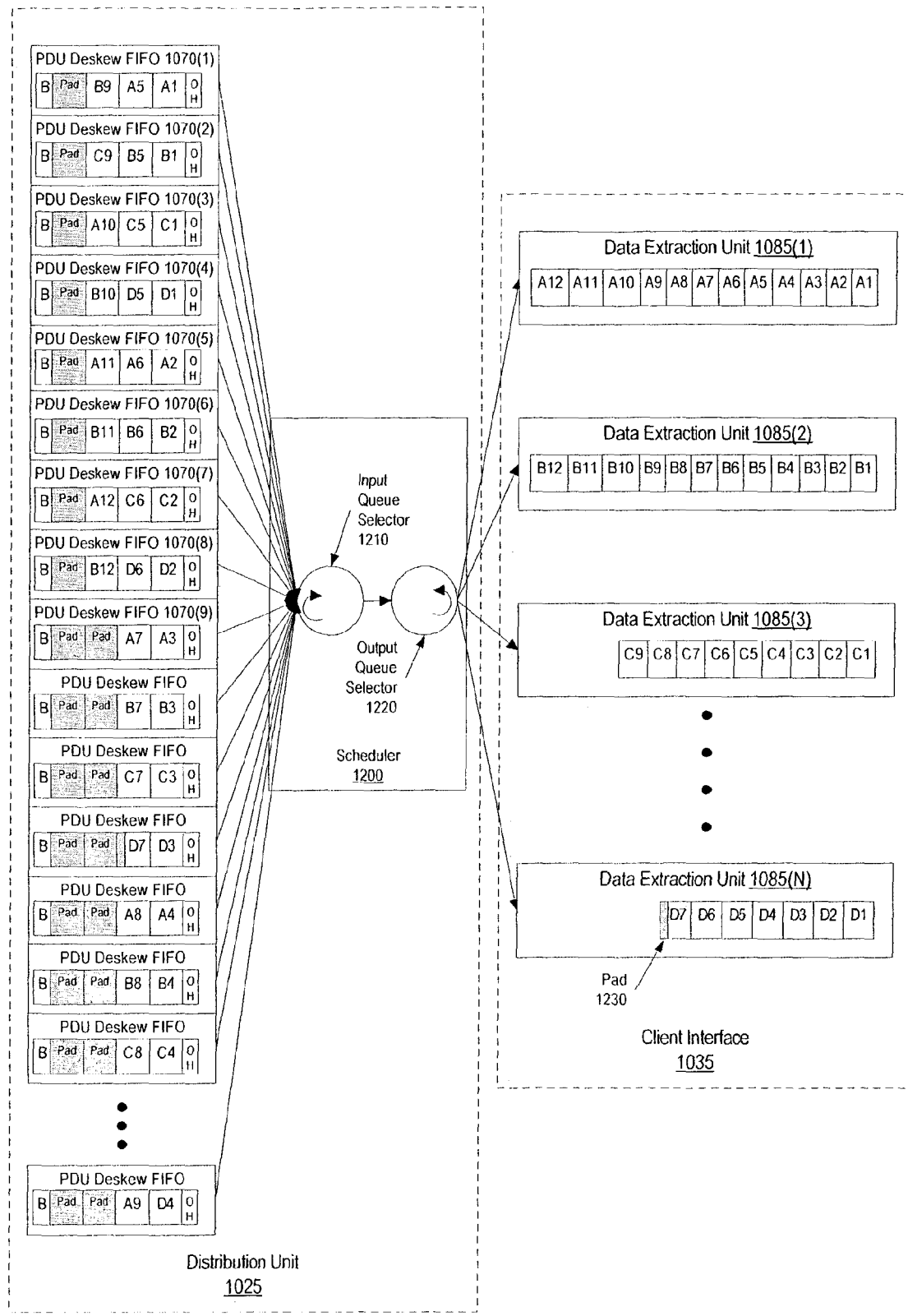
FIG. 12A is a block diagram illustrating portions of a receive side of a transport unit according to embodiments of the present invention.

FIG. 12A is a block diagram illustrating portions of a receive side 1000 of a transport unit such as transport unit 200. Functionality provided by receive side 1000 includes:

1. Individual channel synchronization
2. UTP group synchronization (channels arriving within M PDU time skew window), and resequence channels based on sub channel Ids.
3. Deskewing frames and distributing PDUs from the UTP group to the appropriate clients
4. Extracting client data from the PDUs at the client interface rate Other capabilities include the generation of sub-channel bitmaps and error condition flags for the received sub-channels, as well as the ability to add and delete sub-channels from the deskewed group.

Receive side 1000 includes portions of distribution unit 1025, which is coupled to client interface 1035. The portion of distribution unit 1025 shown in FIG. 12A includes a number of PDU deskew FIFOs (depicted as PDU deskew FIFOs 1070(1)-(M), where, in the coming example, M=16) and a scheduler 1210 (representative of scheduler 1075). Client interface 1035 is shown as including a number of data extraction units (depicted as data extraction units 1085(1)-(N), where, in the subsequent example, N=4).

In the embodiment shown in FIGS. 10 and 12A, line interface 1015, synchronization and resquencing unit 1045, and PDU deskew FIFOs 1070(1)-(M) are capable of performing some or all of the following functions,
1. Channel state monitoring;
2. Frame delineation/synchronization;
3. Overhead CRC (e.g., CRC32) validation;
4. PDU delineation; and
5. Bit-interleaved parity (BIP8) calculation.

Each of PDU deskew FIFOs 1070(1)-(M) receives a byte stream (which is de-scrambled) from synchronization and resquencing unit 1045 (not shown in FIG. 12A). Synchronization and resquencing unit 1045 and line interface 1015 (also not shown in FIG. 12A) use SOF information, CRC32 information and frame length to identify each frame's boundaries, which allows the ready identification of the frame boundary (typically within 3 frame times or less). After reliable frame delineation is accomplished, a channel frame synchronization state machine is used to maintain and monitor channel frame synchronization. Once channel frame synchronization is achieved, inter-channel synchronization is also maintained across the active channels using another state machine. A BIP8 calculation is performed on each frame. Any BIP8 errors are reported to the system processor. A BIP8 error counter is maintained in each one of the channels in order to keep track of their respective error rates.

Client interface 1035, as noted, includes a number of data extraction units (data extraction units 1085(1)-(N)). A scheduler 1200 couples PDU deskew FIFOs 1070(1)-(M) to data extraction units 1085(1)-(N). Scheduler 1200 includes an input selector 1210 and an output selector 1220. Input selector 1210 couples a selected one of PDU deskew FIFOs 1070 (1)-(M) to output selector 1220. In a similar fashion, output selector 1220 couples the output of input selector 1210 to a selected one of data extraction units 1085(1)-(N). It will be noted that the last data block in input queue 1070(12) (designated D7) is a partial data block and includes a pad, which appears in data extraction units 1085(N) as pad 1230.

Figure 12B:
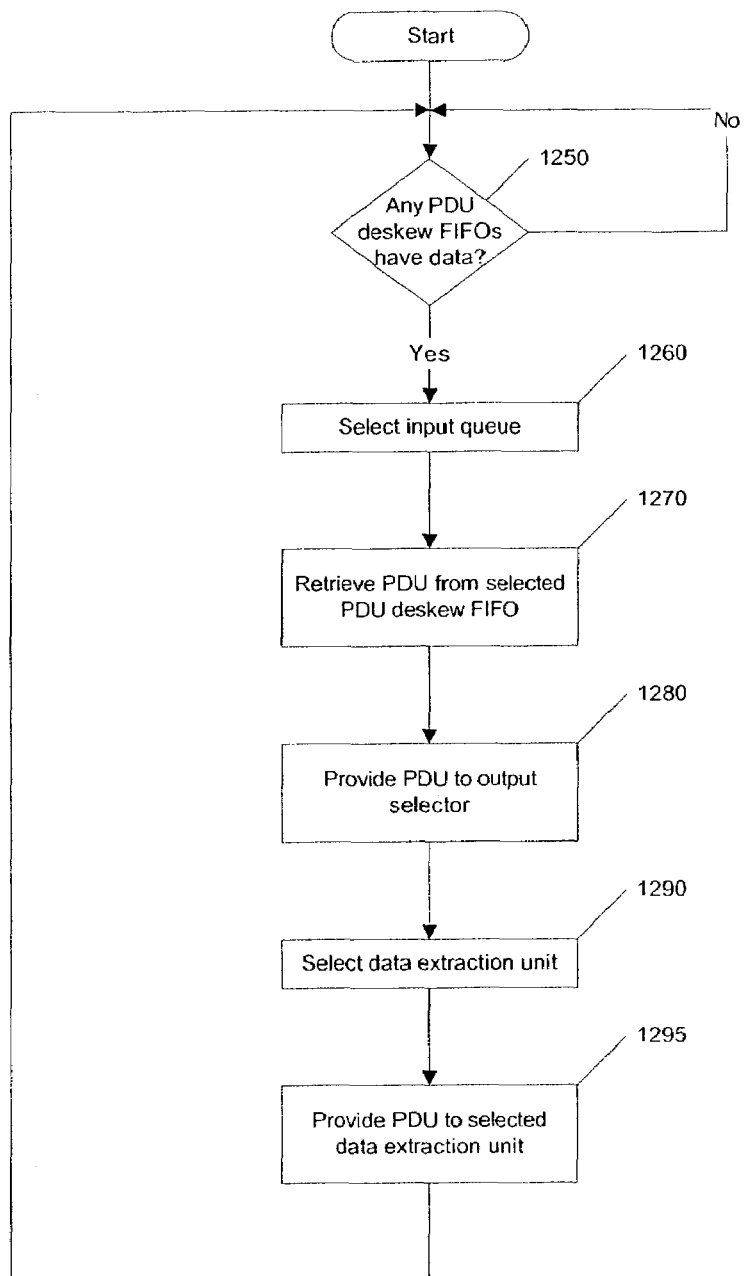
FIG. 12B is a flow diagram illustrating an example of the operation of a portion of a receive side according to embodiments of the present invention.

FIG. 12B is a flow diagram illustrating an example of the operation of that portion of receive side 1000 shown in FIG. 12A. These operations begin with a determination as to whether any of PDU deskew FIFOs 1070(1)-(M) contain any data (step 1250). As long as PDU deskew FIFOs 1070(1)-(M) contain no data, the process awaits the receipt of such data (step 1250). Upon the receipt of data in one or more of PDU deskew FIFOs 1070(1)-(M), payload data units are retrieved from the respective ones of PDU deskew FIFOs 1070(1)-(M) and provided to a corresponding one of data extraction units 1085(1)-(N) in the following manner.

The appropriate PDU deskew FIFO is then selected (step 1260) and the payload data unit retrieved from the given PDU deskew FIFO (step 1270). Next, the payload data unit is provided to the output selector (output selector 1220) by the input selector (input selector 1210) (step 1280). The Output selector selects the data extraction unit to which the PDU will be provided (step 1290) and then provides the given payload data unit to the selected one of data extraction units 1085(1)-(N) (step 1295). This process continues until no further data remains to be provided to any of the data extraction units (step 1250).

Figure 13:
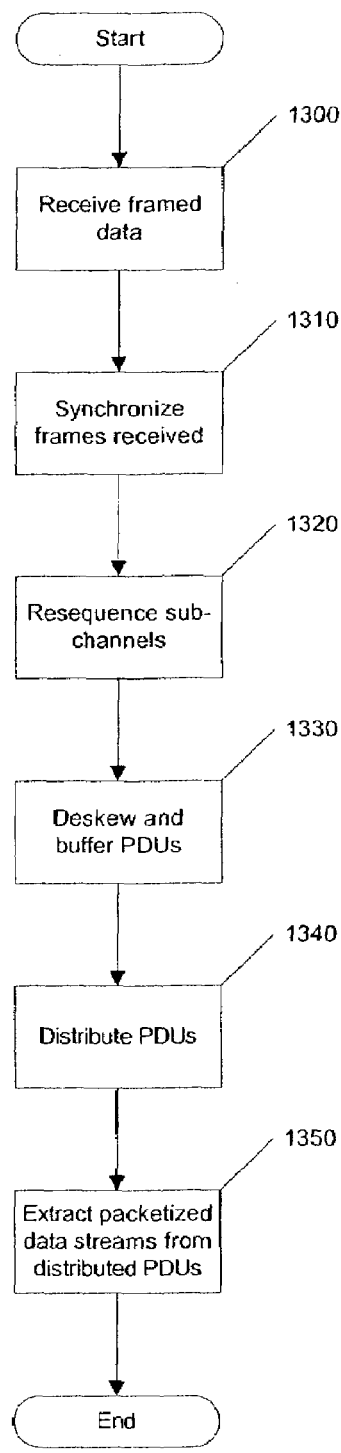
FIG. 13 is a flow diagram of a process for receiving framed data and translating that framed data into packetized data for use by local clients according to embodiments of the present invention.

FIG. 13 is a flow diagram of a process for receiving framed data and translating that framed data into packetized data for use by local clients. The process begins with the receipt of the framed data (step 1300). Once received (e.g., by a line interface such as line interface 1015), the incoming PDU stream is synchronized at the group level (e.g., by a group synchronization unit such as group synchronization unit 1050) (step 1310). Once synchronized at the group level, the PDU streams are then resequenced in order to place the PDU streams in condition for deskewing and distribution (e.g., by a channel resequencing unit such as channel resequencing unit 1055) (step 1320). Once the PDU streams are synchronized and resequenced, the resulting PDU streams can then be deskewed by a PDU deskew FIFO (e.g., PDU deskew FIFO 1070) (step 1330). Typically, both to effect orderly distribution of the PDUs and to provide elasticity in the communications channel, the PDU streams are buffered (step 1330), which can be done separately or in parallel with deskewing. The buffered PDUs are then distributed to the data streams that will ultimately arrive at the various local clients (e.g., by a scheduler such as scheduler 1200) (step 1340). Now that the PDUs have been distributed based on their destination local clients, the packetized data streams contained therein can be extracted (e.g., by data extraction units such as data extraction units 1085(1)-(N) and provided to their respective local clients (e.g., as outgoing data streams 1010(1)-(M)) (step 1350).

State Machine Examples

Figure 14:
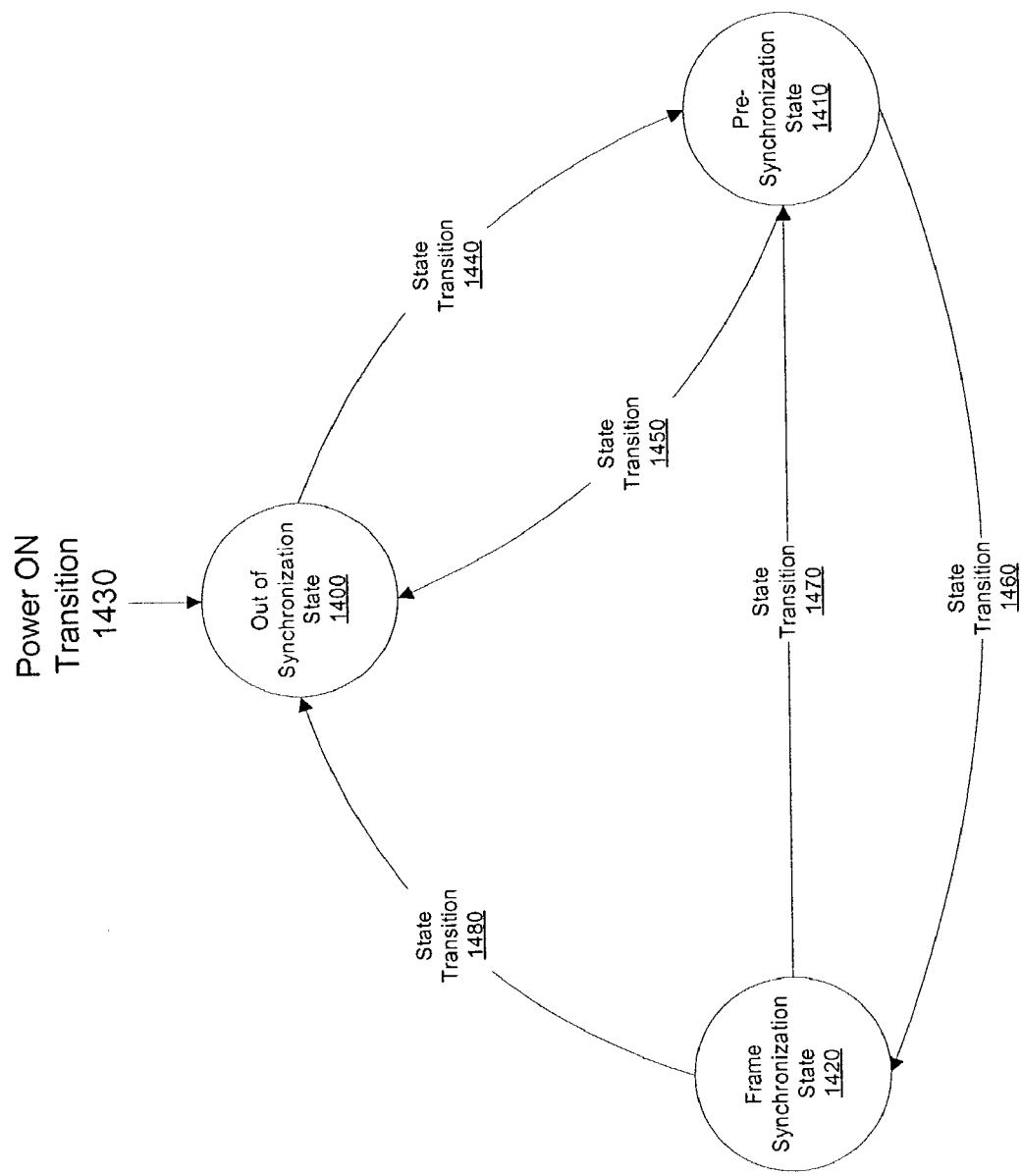
FIG. 14 is a state diagram illustrating an example of a state machine capable of performing frame delineation/frame synchronization using overhead information according to embodiments of the present invention.

FIG. 14 is a state diagram illustrating an example of a state machine capable of performing frame delineation/frame synchronization using overhead information 710. The states in the state diagram of FIG. 14 include an out of synchronization state 1400, a pre-synchronization state 1410 and a frame synchronization state 1420. The state diagram of FIG. 14 is initialized with a "power on" transition 1430, which transitions to out of synchronization state 1400. Out of synchronization state 1400 generates outputs to the management system including an indication of loss-of-signal (LOS) and/or loss-of-frame (LOF), as well as an indication that UTP frame synchronization is currently out of synchronization (and out-of-synchronization state indication).

Once a start-of-frame (SOF) is detected, and followed by valid error detection/correction information (carried in error condition information field 860), a state transition 1440 is taken from out-of-synchronization state 1400 to pre-synchronization state 1410. Once in pre-synchronization state 1410, a pre-synchronization state indication, an indication as to the number of valid UTP frame overhead fields seen (overhead information 710 of FIG. 7), and an indication as to the errors observed in various fields of overhead information 710 (e.g., the information in group identifier field 805, channel identifier field 810 and frame count field 820) are output to the transport unit's management system.

Transitions may then occur from pre-synchronization state 1410 to out-of-synchronization state 1400 or frame synchronization state 1420. A state transition 1450 is taken in the case of an SOF not being found when expected, a reset, or an LOF indication, among other such possible triggers. However, in the case where certain criteria are met, a state transition 1460 is taken from pre-synchronization state 1410 to frame synchronization state 1420. Such criteria can include, for example, an SOF being found at the expected time, the identification of the expected group identifier, the expected channel identifier being within the proper range, a properly incremented frame count and appropriate error detection/correction information. It will be noted that these criteria can be made user-adjustable. In fact, the user can set a threshold (e.g., referred to as M) to control the number of times that these criteria must be met in consecutive frames for state transition 1460 to be taken.

Once state transition 1460 is taken to frame synchronization state 1420, a number of outputs are sent to the transport unit's management system. These outputs include an indication to the management system that UTP frame synchronization has occurred, as well as transferring complete UTP frame overhead (overhead information 1710) to the transport unit's management system. Information is also sent to group synchronization unit 1050, which can include, for example, SOF arrival time, channel identification information and frame count information, as well as the PDUs themselves. As time goes on, however, if errors are detected in any of this information, a state transition 1470 is taken, which transitions the current state from frame synchronization state 1420 to pre-synchronization state 1410. Such errors can include, but are not limited to, the following: if M consecutive PDUs (where M can be made user-selectable); or if HEC errors, parity errors or sequence number errors are observed. Similarly, state transition 1470 can be made to occur if N consecutive frames (where N can be made user-selectable) exhibit one or more of the following error types: SOF errors, group identifier errors, channel identifier errors, frame count errors, or errors detected via error condition information field 860. Frame synchronization can also transition from frame synchronization state 1420 directly to out-of-synchronization state 1400 via a state transition 1480, in the case of a reset or LOF.

Figure 15:
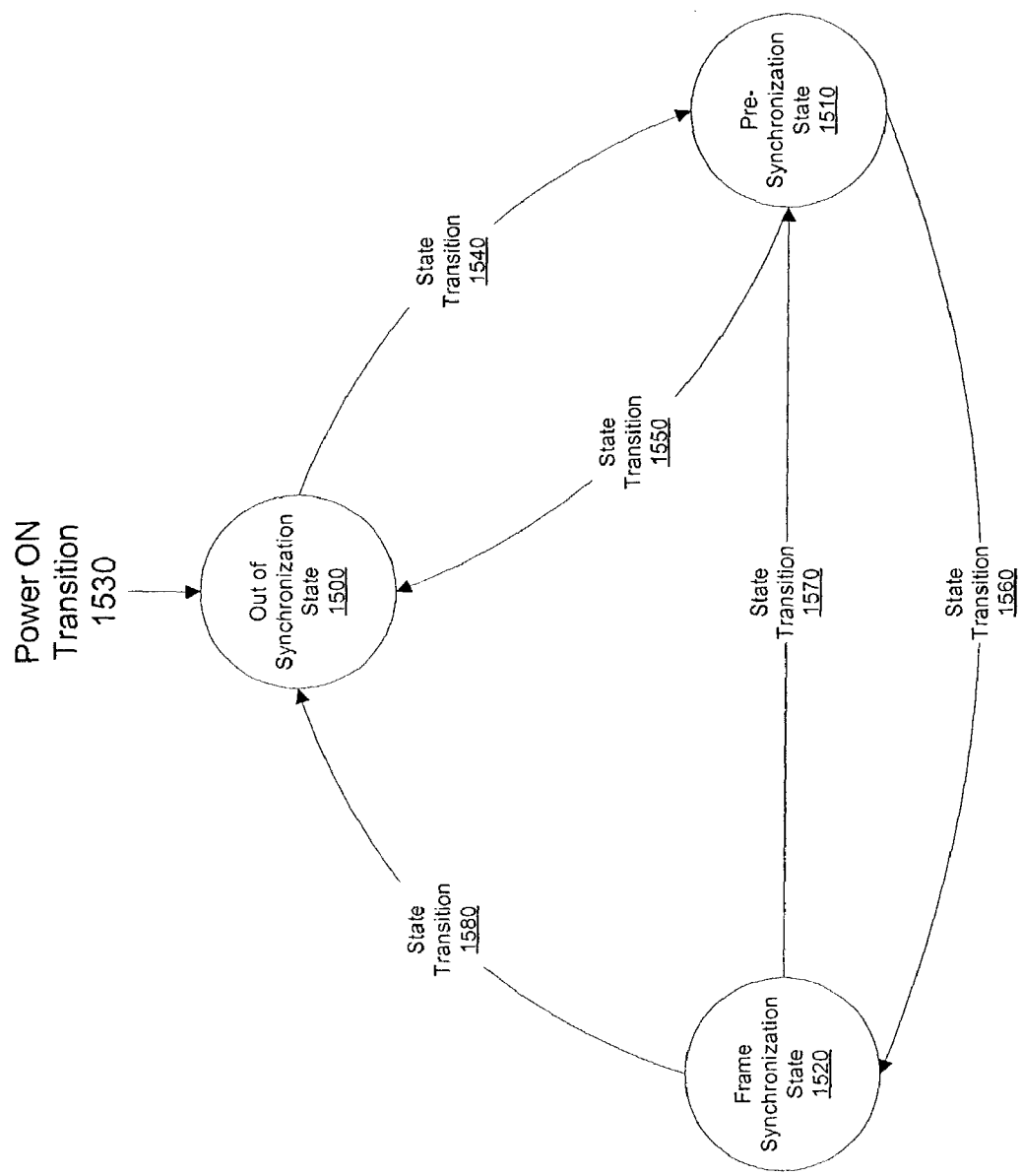
FIG. 15 is a state diagram illustrating an example of a state machine capable of performing frame delineation/frame synchronization using the information contained in PDU overhead according to embodiments of the present invention.

FIG. 15 is a state diagram illustrating an example of a state machine capable of performing frame delineation/frame synchronization using the information contained in PDU overhead (PDU overhead section 915). Similar to the state diagram of FIG. 14, the state diagram of FIG. 15 includes an out-of-synchronization state 1500, a pre-synchronization state 1510 and a frame synchronization state 1520. As before, the state diagram is initialized via a "power on" transition 1530. It will be noted, and so not repeated here, that the outputs to the transport unit's management system, as well as to group synchronization unit 1050, are the same for the states depicted in FIG. 15 as for those depicted in FIG. 14. Of course, the transitions depicted in FIG. 15 are caused by different stimuli, which are now described in detail.

Once in out-of-synchronization state 1500, the state diagram of FIG. 15 transitions to pre-synchronization state 1510 via a state transition 1540. In one embodiment, state transition 1540 is caused by the detection of valid HEC information (contained in HEC field 960). Once in pre-synchronization state 1510, a state transition 1550 is taken back to out-of-synchronization state 1500 in, for example, one of the following situations. State transition 1550 is taken if a valid HEC value is not observed when expected and a parity error is detected, if a reset occurs, or if an LOF occurs.

Assuming normal operation, a state transition 1560 is taken from pre-synchronization state 1510 to frame synchronization state 1520 upon the occurrence of the following events. In order for state transition 1560 to be taken, criteria such as the observing of valid HEC information when expected, PDU sequence numbers increment properly and PDU parity information is correct should be met. In some embodiments, a given number of PDUs must be observed to meet these criteria, and that number can be made user-selectable. Once in frame-synchronization state 1520, state transitions can occur in the face of errors, and cause transitions to either pre-synchronization state 1510 or to out-of-synchronization state 1500. In the former case, a state transition 1570 can occur when HEC errors, parity errors or sequence number errors are observed for M consecutive PDUs (where M is user-selectable), or where SOF errors, group identifier errors, channel identifier errors, frame count errors or errors detected by the information maintained in error correction field 860. State transition 1580 is taken from frame synchronization state 1520 to out-of-synchronization state 1500 if a reset or LOF are experienced.

FIG. 16 is a state diagram illustrating a state machine capable of finding and synchronizing on the largest group of channels that arrive within a specified skew window (UTP group synchronization). The state diagram of FIG. 16 includes a group search state 1600, a group check state 1610 and a group formed state 1620. The state diagram is initialized via a "power on" transition of 1630. This transitions to group search state 1600, in which an indication of group search 1600 is provided an output to the transport unit's management system. A state transition 1610 is taken from group search state 1600 to group check state 1610 when a channel is observed more than once (i.e., at least one frame-time has elapsed). Once in group check state 1610, a state transition 1620 to group search state 1600 may be taken in the case where no channels are seen during a skew window or a reset occurs.

Assuming normal operation, a state transition 1630 is taken from group check state 1610 to group formed 1620, in the case where a stable group is seen for at least M consecutive skew windows (where M is user-selectable). Once is group formed state 1620 a number of outputs are sent to the management system of the transport unit. These outputs include an indication that the state is group formed state 1620, information regarding the channel identifiers of the channel seen during a given skew window (as well as the total amount of skew observed). Outputs to PDU deskew FIFOs 1070(1)-(M) and scheduling control unit 1080 include the transmission of PDUs to the proper one of PDU deskew FIFOs 1070(1)-(M), as well as providing a frame count of the PDUs thus transmitted. A state transition 1640 is taken from group formed state 1620 to group search state 1600 in the case where either a reset occurs or no channels are observed during a given skew window.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

The invention claimed is:

1. A transport unit comprising:
    a plurality of payload data unit (PDU) formation units, wherein a PDU formation unit of said PDU formation units is configured to add PDU overhead information to data received as a data stream received by said PDU formation unit;
    a plurality of frame formation units; and
    a scheduler, wherein
        an input of said scheduler is coupled to said plurality of PDU formation units, an output of said scheduler is coupled to said plurality of frame formation units, said scheduler is configured to receive a PDU stream from each of said PDU formation units and to provide PDUs of said PDU streams to said frame formation units, said scheduler is configured to provide said PDUs to said frame formation units using a strict-priority round-robin scheduling methodology, and each of said frame formation units are configured to generate a frame comprising the provided PDUs.

2. The transport unit of claim 1, wherein said PDU formation unit of said PDU formation units is further configured to encapsulate said data prior to said adding said PDU overhead information.

3. The transport unit of claim 1, wherein a frame formation unit of said frame formation units is configured to add frame overhead information to received PDUs of the PDU stream received by said frame formation unit.

4. The transport unit of claim 3, wherein said frame formation unit is further configured to add a stuff byte prior to said adding said frame overhead information.

5. A transport unit comprising:

a distribution unit, wherein said distribution unit comprises a group synchronization unit configured to receive a plurality of payload data units (PDUs), wherein each of said PDUs belong to one of a plurality of groups, and synchronize said PDUs based on a one of said groups to which each of said PDUs belongs, a channel resequencing unit, coupled to said group synchronization unit, and configured to resequence data received from a plurality of channels in order to place the data in a same channel order as when the data was transmitted, and perform said resequencing based upon a channel identifier associated with the data, and a scheduler coupled to said channel resequencing unit, wherein said scheduler is configured to select data stored by said channel resequencing unit and provide said data to a data extraction unit.

6. The transport unit of claim 5, further comprising:

a line interface; and a client interface, wherein an input of said distribution unit is coupled to said line interface, and an output of said distribution unit is coupled to said client interface.

7. The transport unit of claim 6, wherein said line interface comprises:

a plurality of channel synchronization units.

8. The transport unit of claim 6, wherein said client interface comprises:

a plurality of data extraction units.

9. The transport unit of claim 5, wherein said distribution unit further comprises:

a plurality of deskew FIFOs, said deskew FIFOs coupled between said channel resequencing unit and said scheduler.

10. The transport unit of claim 9, wherein said channel resequencing unit is configured to receive a plurality of payload data units (PDUs), and resequence said PDUs to place said PDUs in a sequence for extraction by said scheduler.

* * * * *